(12) United States Patent
Diamant

(10) Patent No.: US 11,468,304 B1
(45) Date of Patent: Oct. 11, 2022

(54) SYNCHRONIZING OPERATIONS IN HARDWARE ACCELERATOR

(71) Applicant: Amazon Technologies, Inc., Seattle, WA (US)

(72) Inventor: Ron Diamant, Santa Clara, CA (US)

(73) Assignee: Amazon Technologies, Inc., Seattle, WA (US)

(*) Notice: Subject to any disclaimer, the term of this patent is extended or adjusted under 35 U.S.C. 154(b) by 430 days.

(21) Appl. No.: 16/696,377

(22) Filed: Nov. 26, 2019

(51) Int. Cl.
*G06N 3/063* (2006.01)
*G06F 17/15* (2006.01)
*G06F 15/80* (2006.01)

(52) U.S. Cl.
CPC ........ *G06N 3/063* (2013.01); *G06F 15/8046* (2013.01); *G06F 17/15* (2013.01)

(58) Field of Classification Search
None
See application file for complete search history.

(56) References Cited

U.S. PATENT DOCUMENTS

| 10,761,822 | B1* | 9/2020 | Borkovic | G06F 9/30087 |
| 2012/0216080 | A1* | 8/2012 | Bansal | G06F 11/348 714/45 |
| 2013/0086566 | A1* | 4/2013 | Gaster | G06F 9/45525 712/7 |
| 2015/0067369 | A1* | 3/2015 | Henry | G06F 1/32 713/323 |
| 2015/0301983 | A1* | 10/2015 | Vorbach | G06F 15/7807 712/32 |
| 2015/0339256 | A1* | 11/2015 | Dupont De Dinechin | G06F 9/30087 712/29 |
| 2017/0315812 | A1* | 11/2017 | Smith | G06F 9/3855 |
| 2019/0324746 | A1* | 10/2019 | Maiyuran | G06F 9/3001 |

* cited by examiner

*Primary Examiner* — Eric Coleman
(74) *Attorney, Agent, or Firm* — Kilpatrick Townsend & Stockton LLP

(57) ABSTRACT

In one example, a hardware accelerator comprises an event register that stores an event; a hardware execution engine; and a controller configured to: extract, from an instruction, parameters of an operation to be performed by the hardware execution engine, and a synchronization primitive of a plurality of synchronization primitives for the event; and based on the synchronization primitive, perform at least one of: controlling a start time of the operation at the hardware execution engine, or determining whether to access the event register. The synchronization primitives include a set operation to set the event and/or a wait operation to suspend the operation at the hardware execution engine until the event is set. The plurality of synchronization primitive defines different conditions to be satisfied in order to perform the set operation.

20 Claims, 18 Drawing Sheets

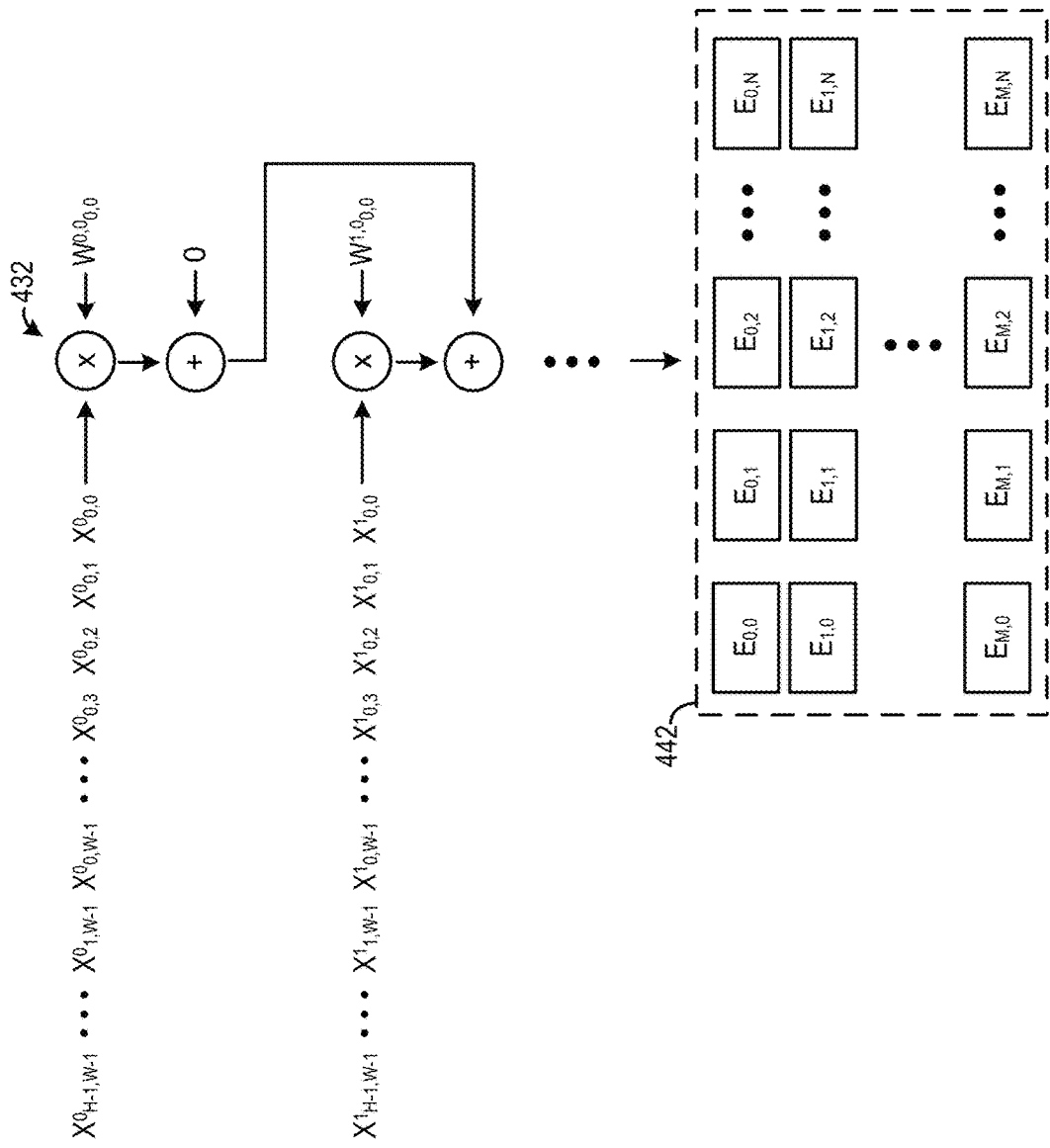

SYNCHRONIZING OPERATIONS IN HARDWARE ACCELERATOR

BACKGROUND

Artificial neural networks are computing systems with an architecture based on biological neural networks. Artificial neural networks can be trained, using training data, to learn about how to perform a certain computing task for an application.

A hardware accelerator, such as a neural network processor, can implement an artificial neural network by performing various operations associated with the artificial neural network. The operations may include, for example, different types of computation operations, memory access operations, etc. A hardware accelerator typically includes hardware components dedicated to executing these operations. There can be data and resource dependency among operations executed by different hardware components. Synchronization between these operations may be needed to ensure correct operations.

BRIEF DESCRIPTION OF THE DRAWINGS

Various embodiments in accordance with the present disclosure will be described with reference to the drawings, in which:

FIGS. 4A-4F illustrate an example neural network processor and its operations, according to certain aspects of the present disclosure;

DETAILED DESCRIPTION

Figure 1:
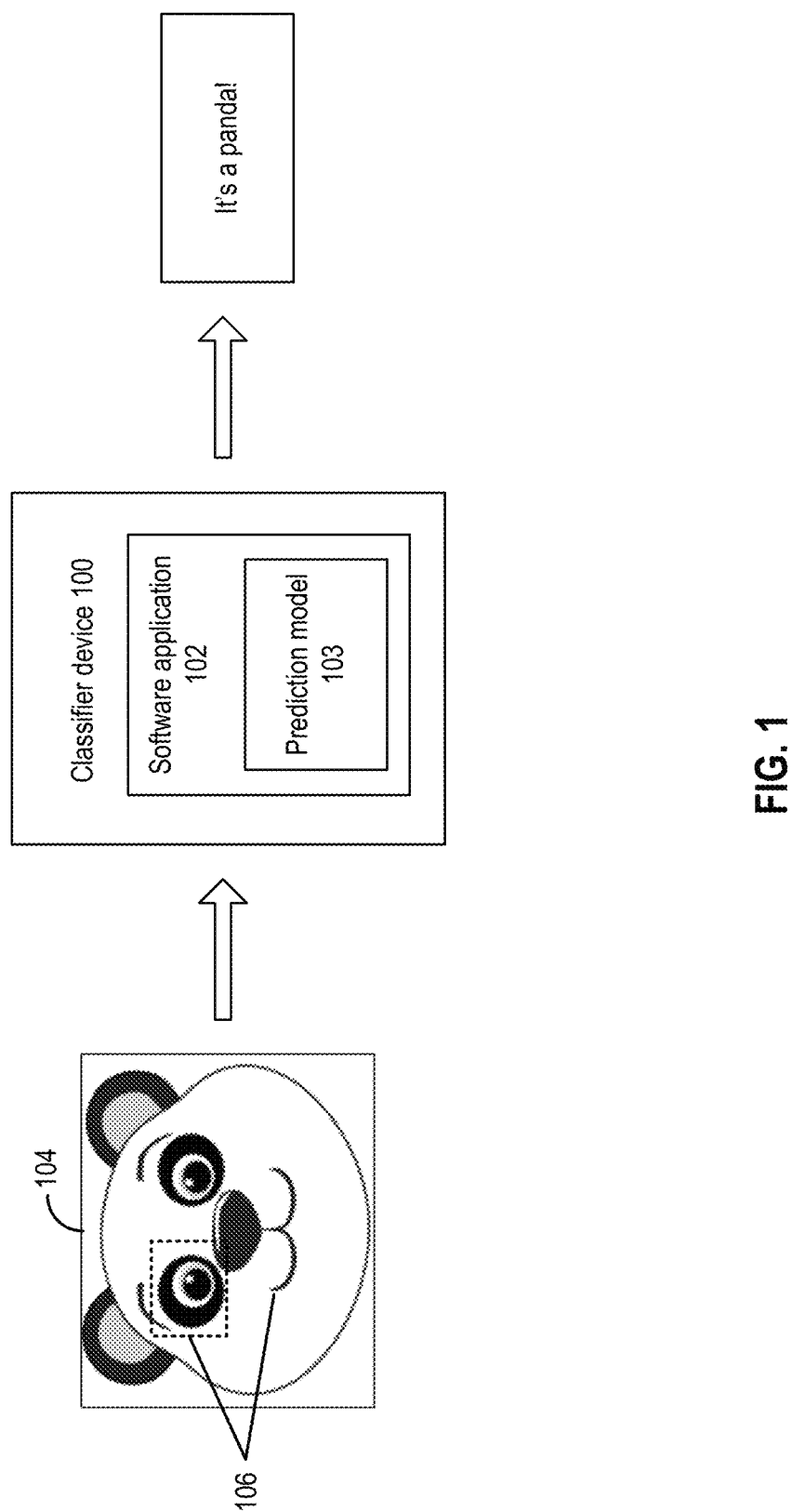
FIG. 1 illustrates an example of a classifier device that uses techniques disclosed herein to process data.

Examples of the present disclosure relate to the hardware accelerator, and more specifically, techniques to synchronize operations in a hardware accelerator.

A hardware accelerator can include a plurality of hardware execution engines each that can each be programmed to perform a specific accelerator operation to accelerate a particular function. For example, a neural network processor can include a plurality of hardware execution engines each corresponding to a different processing stage of a neural network to accelerate a neural network operation. Specifically, a neural network hardware accelerator may include a systolic array to perform arithmetic operations to generate intermediate outputs of a neural network layer, a pooling engine to optionally reduce the dimension of the intermediate outputs, and an activation engine to optionally apply an activation function on the reduced intermediate outputs to generate outputs of the neural network layer.

Some of the operations at these hardware execution engines may have data and/or resource dependency among them, which require these operations to be synchronized to ensure correct outputs are generated, while some of the operations can be performed in parallel. For example, to support a first neural network operation, the systolic array may perform a first arithmetic operation to compute a first set of intermediate outputs and store the first set of intermediate outputs at a first location in a summation buffer allocated as an temporary storage space for the first neural network operation. The activation engine can obtain the first set of intermediate outputs from the first location, perform a first activation operation to generate a first set of activation outputs, and store the first set of activation outputs at the first location in place of the first set of intermediate outputs. The pooling engine can obtain the first set of activation outputs from the first location, and perform a first pooling operation to generate a first set of pooling outputs which can be stored in another memory as a set of outputs of the first neural network operation. Meanwhile, the systolic array can perform a second arithmetic operation to generate a second set of intermediate outputs and store a second set of intermediate outputs at the first location. The second set of intermediate outputs can then be processed by a second activation operation at the activation engine and a second pooling operation at the pooling engine to generate another set of outputs of the first neural network operation.

There exists data dependency among at least some of the operations described above, which require synchronization among these operations to ensure correct operations. For example, as the first activation operation takes the outputs of the first arithmetic operation as input, data dependency exists between the first activation operation and the first arithmetic operation. Moreover, as the first pooling operation takes the outputs of the first activation operation as inputs, data dependency also exists between the first pooling operation and the first activation operation. Because of the data dependencies, the first activation operation and the first arithmetic operation should be synchronized such that the first activation operation should be executed only after the systolic array completes the first arithmetic operation and the write operation of the first set of intermediate outputs to the summation buffer, but not before or in parallel. Moreover, the first pooling operation and the first activation operation should be synchronized such that the first pooling operation should be executed after the write operation of the first set of activation outputs to the summation buffer, but not before or in parallel.

In addition, there also exists resource dependency where operations having no data dependency seek to access the same resource. For example, at the end of the second arithmetic operation, which has no data dependency with the first pooling operation, the systolic array may perform a write operation to store a second set of intermediate outputs at the first location of the summation buffer. But the write operation to store the second set of intermediate outputs should be performed only after the pooling engine completes the read operation of the first set of activation outputs from the summation buffer for the first pooling operation, otherwise, the first pooling operation may be based on a wrong set of inputs. Therefore, the second arithmetic operation should be synchronized with the first pooling operation such that the second arithmetic operation is performed only after the read operation for the first pooling operation completes.

On the other hand, in some cases, the systolic array, the pooling engine, and the activation engine can also perform operations in parallel when there is no data dependency and no resource dependency among the operations. For example, a second neural operation can use a different location of the summation buffer. A third arithmetic operation of the second neural operation can be performed at the systolic array in parallel with the first activation operation as there is no data dependency nor resource dependency between the third arithmetic operation and the first activation operation. Moreover, a third activation operation can be performed at the activation engine in parallel with the first pooling operation at the pooling engine, as there is no data dependency nor resource dependency between the third activation operation and the first pooling operation.

One way to synchronize two execution engines is based on an event, which is also generally known as "conditional variable" and "message" and can be a synchronization primitive. Various operations can be defined as an event to achieve synchronization. For example, a SET instruction can cause an execution engine to set an event (e.g., to a first value such as a logical one), while a WAIT instruction can cause the execution engine to suspend operation and wait for the event to be set, or a WAIT-AND-CLEAR instruction to wait for the event to be set, and then clear the event (e.g., by setting the event to a second value such as a logical zero). The passing of the event from one execution engine to another execution engine can be based on writing an event register that is accessible by both execution engines. To define the timing dependency between two instructions to be executed by two different execution engines, a SET event instruction can be inserted after an earlier instruction, and a WAIT (or WAIT-AND-CLEAR) instructions can be inserted before a later instruction.

Although two execution engines can be synchronized by the SET and WAIT (or WAIT-AND-CLEAR) instructions, these instructions can add substantially to the footprint and complexity of instructions of the hardware accelerator. There also lacks an explicit association between a particular SET/WAIT/WAIT-AND-CLEAR instruction and an operation instruction at the execution engine, which makes it difficult for a programmer to track which operations/execution engines are being synchronized by a set of SET/WAIT/WAIT-AND-CLEAR instructions, especially in a complex instruction program where some operations can be executed in parallel while some operations need to be synchronized. Further, there is also a lack of support for low-level synchronization operation instructions that differentiate between data and resource dependencies. All these can present substantial challenges to programming a hardware accelerator to implement a complex neural network while accounting for the data and resource dependencies among the neural network operations.

Examples of the present disclosure relate to a hardware accelerator, and in particular, a hardware accelerator that supports instructions having inline synchronization primitives. In one example, a hardware accelerator includes an event register that stores an event, a plurality of hardware units each including a controller and an execution engine. The controller of a hardware unit can receive an instruction comprising parameters of an accelerator operation to be performed by the execution engine of the hardware unit, as well as an inline synchronization primitive for the event. The controller can extract the parameters of the operation and the synchronization primitive from the instruction and, based on the synchronization primitive, perform at least one of: controlling a start time of the operation at the hardware execution engine based on the event or setting the event.

Specifically, the synchronization primitive can be part of a plurality of synchronization primitives defined in an instruction set supported by the hardware accelerator. The plurality of synchronization primitives may define synchronization operations including, for example, a SET operation to set an event, a WAIT operation to suspend the accelerator operation until the event is set, a WAIT-AND-CLEAR operation to suspend the accelerator operation until the event is set and then to clear the event, etc. The synchronization primitive can also identify a condition to be satisfied to perform the SET operation. The condition may include, for example, the hardware execution engine completing the accelerator operation defined in the instruction. The accelerator operation may include, for example, a memory access operation, a computation operation, etc. The plurality of synchronization primitives may also include primitives such as "SET no event" and "WAIT no event" to identify that the accelerator operation at an execution engine does not need to be synchronized with another instruction at another execution engine.

The accelerator operations at the hardware units of the hardware accelerator can be synchronized based on the synchronization primitives to account for the data dependency and/or resource dependency among the operations. In one example, a first hardware unit, which can include a systolic array, can execute a first instruction to perform a convolution operation to generate a first output, and perform a write operation to store the first output at a summation buffer. A second hardware unit, which can include a postprocessor such as an activation engine and/or a pooling engine, can perform a read operation to retrieve the first output from the summation buffer and perform a post-processing operation on the first output to generate a second output.

To account for the data dependency between the convolution operation and the post-processing operation, the first instruction can include a first synchronization primitive indicating that a SET operation to set an event is to be performed after the write operation of the first output completes, while the second instruction can include a second synchronization primitive indicating a WAIT operation (or a WAIT-AND-CLEAR operation) of the event. As part of the execution of the first instruction, the first execution engine can perform the accelerator operation specified in the first instruction. The first controller can perform the write operation to store the first output at the memory and then set the event based on the first synchronization primitive. Meanwhile, as part of the execution of the second instruction, the second controller can control, based on the second synchronization primitive, the second execution engine to suspend the read operation for the first output, as well as the post-processing operation in the second instruction until the event is set. After determining that the event is set, the second controller can control the second execution engine to proceed with the read operation and the subsequent post-processing operation. With such arrangements, the second hardware unit can perform the read operation for the first input only after the first hardware unit completes writing the first input to the summation buffer, which can ensure proper operation at the second hardware unit in light of the data dependency.

In some examples, resource dependency may arise when, for example, the first hardware unit performs a new convolution operation and then performs a write operation to the same location of the summation buffer from which the second hardware unit performs the read operation for the first output. To account for the resource dependency, the second instruction can include a third synchronization primitive indicating that a second event is to be set after the read operation completes. Moreover, a third instruction including the third accelerator operation can include a fourth synchronization primitive indicating that the third accelerator operation is to be suspended until the second event is set. With such arrangements, the first hardware unit does not overwrite the first output until the second hardware unit completes the read operation for the first output, which can also ensure proper operation at the second hardware unit in light of the resource dependency. The wait time for the first hardware unit can also be reduced as it needs not to wait until the second hardware unit completes the post-processing operation to start the new convolution operation.

With the disclosed techniques, an instruction that identifies an accelerator operation can also include one or more inline synchronization primitives, which can eliminate the need for standalone instructions for synchronization operations. Moreover, the disclosed techniques also provide support for low-level synchronization operations that differentiate between data and resource dependencies. Such arrangements not only reduce the footprint of instructions but also allow different types of synchronization operations to be tightly coupled with an accelerator operation in an instruction. This provides easy tracking of synchronization (or lack of synchronization) among instructions, especially in a complex instruction program for a complex neural network, which can improve the robustness of the operations the hardware accelerator being programmed to perform.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example classifier device 100 that uses techniques disclosed herein to process data. Classifier device 100 can be, for example, a computing device operating a software application 102 and a prediction model 103 to predict information included in a data sequence and perform a predetermined function based on the prediction. For example, classifier device 100 can be part of an image recognition service provided to identify certain objects (e.g., text, a person, etc.) from an image. It is understood that the image recognition service is merely provided as an illustrative example and that techniques disclosed herein can be used for other data processing applications including, for example, text-based data processing (e.g., processing of search queries), audio data processing, etc. Moreover, classifier device 100 may operate a number of different prediction models to process different input data, either in parallel or at different times.

In some examples, the image recognition service can be provided in a multi-tenant computing service system. The multi-tenant computing service system may typically include a plurality of servers that can host data and be used by multiple clients or organizations to run instances, such as virtual machine instances or bare metal instances (e.g., operating systems that run directly on the server hardware). In most instances, such as bare-metal or virtual machine instances, a multi-tenant computing service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 1, the multi-tenant computing service system may provide the image recognition service when the client needs it, and the service is decommissioned when it is no longer needed, such that the resources supporting the image recognition service (e.g., access to software application 102, and the underlying hardware resources for processing software application 102) can be reallocated to other clients. Different clients (or one client) may request software application 102 to perform processing of different input data using the same or different prediction models including prediction model 103.

In the example of FIG. 1, software application 102 can receive pixel data of an image 104 from a user. Image 104 may include an array of pixels. Software application 102 can perform analysis on the pixel data, and predict one or more objects 106 depicted in image 104. The analysis may include, for example, comparing the pixel data against a set of predetermined features data. The predetermined features data may include data associated with a set of predetermined visual image features such as, for example, a nose object, a mouth object, etc. The predetermined features data may also include data associated with non-visual image features, or a combination of visual and non-visual image features. As to be discussed in more detail below, software application 102 may employ prediction model 103 to compute a set of scores based on the pixel data of image 104. The set of scores may represent, for example, the likelihood of image 104 including the image features represented by the features data. Software application 102 can then determine other information about the content of image 104 based on the scores. For example, based on the scores, software application 102 can determine that image 104 is an image of, for example, a panda, a cat, or other objects.

Prediction model 103 can be in the form of an artificial neural network. The artificial neural network may include a plurality of processing nodes, with each processing node configured to process part of the input pixel data or to further process the intermediate outputs from other processing nodes. FIG. 1 illustrates an example of prediction model 103 that uses techniques disclosed herein. In FIG. 1, prediction model 103 may be a multi-layer neural network such as a deep neural network (DNN), a convolutional neural network (CNN), etc. Prediction model 103 may include an input layer 207, a set of intermediate layers including intermediate layers 209 and 211, and an output layer (not shown in FIG. 2A). It is understood that prediction model 103 can also include other different types of neural networks including, for example, long short-term memory (LSTM), multilayer perception (MTP), multiscale densenet (MSDNET), etc.

Layer 207 may process pixel data representing different portions of image 104. For example, in the example of FIG. 2A, layer 207 may process the pixel data of image 204. Each processing node of layer 207 is assigned to receive a pixel value (e.g., $x_0$, $x_1$, $x_2$, . . . $x_n$) corresponding to a predetermined pixel within image 104, and transmit one or more weights with the received pixel value to layer 209. In a case where prediction model 203 is a DNN, each processing node of layer 207 can be assigned a set of weights defined based on a matrix W1. Each processing node of layer 207 can send the received pixel value and the assigned weights to each processing node of layer 209. In a case where prediction model 103 is a CNN, groups of the processing nodes of layer 207 may share a set of weights, and each group may send the set of weights and the pixel values received by the group of processing nodes to a single processing node of layer 209. Different neural network models may include different topologies (e.g., including a different number of layers, different connections between layers, etc.), and/or include a different set of weights for each layer.

Layer 209 may process the scaled outputs from layer 207 to generate a set of intermediate outputs. For example, assuming processing node 210a of layer 209 is connected to n processing nodes in layer 207, processing node 210a may generate a sum of the scaled outputs received from layer 207 based on the following equation:

$$\text{sum}_{210a} = \sum_{i=0}^{n} (W1_i \times x_i) \qquad \text{(Equation 1)}$$

Here, $\text{sum}_{210a}$ represents an intermediate output generated by processing node 210a. $W1_i \times x_i$ represents a scaling of a particular pixel value (e.g., $x_0$) with the associated weight (e.g., $W1_0$) by a processing node of layer 207. In a case where prediction model 103 is a DNN, each processing node of layer 209 may generate the sum based on the scaling of pixel values from each processing node of layer 207, and then generate a sum (e.g., $\text{Sum}_{210a}$) by summing the scaled pixel values. The sum may also represent a dot-product between an input vector comprising a number of elements (e.g., pixel values) and a weight vector (e.g., W1). In some examples, bias can also be added to the scaled outputs to generate the intermediate output.

In a case where prediction model 103 is a CNN, each processing node of layer 209 may generate the intermediate output based on the scaling of pixel values from a group of processing nodes of layers 207. The intermediate output may represent a convolution result between a group of pixel values and a filter comprising the weight values. FIG. 2B illustrates an example of a convolution operation that layer 209 may perform. In FIG. 2B, filter 230 may include a two-dimensional array of weights. The weights in filter 230 may represent a spatial distribution of pixels for certain features to be detected from the image. The two-dimensional array may have a height of R rows and a width of S columns and is typically smaller than an input image with a height of H pixels and a width of W pixels. Each weight may be mapped to a pixel in a rectangular block of pixel values with the same R rows and S columns. A processing node of layer 209 (e.g., processing node 210a) can receive, from a group of processing nodes of input layer 207, a group 240 of pixel values corresponding to a first rectangular block of pixels from the input image, which corresponds to a first stride location of filter 230, and generate a convolution output 242 based on a summation of multiplication results between each weight of filter 230 and each corresponding pixel in group 240 according to Equation 1, to generate a dot-product between a matrix represented by filter 230 and a matrix represented by group 240. Another processing node of layer 209 can also receive, from another group of processing nodes of input layer 207, a group 244 of pixel values corresponding to a second rectangular block of pixels from the input image corresponding to a second stride location of filter 230, and generate a convolution output 246 based on a summation of multiplication results between each weight of filter 230 and each corresponding pixel in group 244 according to Equation 1, to generate a dot-product between the matrix of filter 230 and a matrix represented by group 240. In some examples, each convolution output in FIG. 2B (e.g., convolution output 242, convolution output 246, etc.) can correspond to the output of a processing node of layer 209. In some examples, the pixel data in the input image may be referred to as an input feature map to indicate that the pixels are processed by the same filter (or same sets of filters) corresponding to certain feature(s). The convolution outputs may be referred to as an output feature map to indicate that the output is the result of processing an input feature map with the filter.

As shown in FIG. 2B, the convolution operations can be arranged in a sliding-window such that the second rectangular block overlaps, or is otherwise adjacent to, the first rectangular block in the input image. For example, in the example of FIG. 2B, D may be a distance of stride (in pixel) of the sliding-window for each convolution operation, such that the block of pixels corresponding to group 244 may be situated at a distance D (in terms of pixels) from the block of pixels corresponding to group 240, and the next block of pixels may also be situated at the same distance D from group 244. Other processing nodes of layer 209 may also receive groups of pixels corresponding to other rectangular blocks and generate other intermediate outputs. The convolution outputs can be part of a convolution output array. The array of convolution outputs can have a smaller height and a smaller width than the input image. Rectangular blocks of the convolution outputs can be further grouped, and convolution operations can be performed at layer 211 between the groups of convolution outputs and another set of filter weights to generate another set of convolution outputs.

In some examples, the convolution operations can be performed between multiple images and multiple filters. For example, referring to FIG. 2C, a set of C filters 260 may corresponds to a number (C) of images 270, and convolution operations can be performed between each filter of the set of filters 260 and blocks of pixels on the corresponding image of images 270. Each of the images 270 can corresponds to an input channel. The convolution results for each filter-image pair can be summed to generate a convolution output as follows:

$$O_{e,f} = \sum_{r=0}^{R-1} \sum_{s=0}^{S-1} \sum_{c=0}^{C-1} X^c_{eD+r,fD+s} \times W^c_{r,s} \qquad \text{(Equation 2)}$$

Here, the convolution operation involves the images (or pixel arrays). $X^c_{eD+r,fD+s}$ may refer to the value of a pixel at an image of index c, within the number (C) of images 270, with a row coordinate of eD+r and a column coordinate of fD+s. For the rest of the disclosure, the coordinates of the element $X^c_{eD+r,fD+s}$ can be represented in the form of (eD+r, fD+s). The index c can denote a particular input channel. D is the sliding-window stride distance, whereas e and f correspond to the location of the data element in the convolution output array, which can also correspond to a particular sliding window. Further, r and s correspond to a particular location within the sliding window. A pixel at an (r, s) location and of an image of index c can also correspond to a weight $W^c_{r,s}$ in a corresponding filter of the same index c at the same (r, s) location. Equation 2 indicates that to compute a convolution output $O_{e,f}$, each pixel within a sliding window (indexed by (e,f)) may be multiplied with a corresponding weight $W^c_{r,s}$. A partial sum of the multiplication products within each sliding window for each of the images within the image set can be computed. And then a sum of the partial sums for all images of the image set can be computed.

Moreover, in some examples, multiple sets of filters can be used to perform convolution operations with a set of images to generate a set of convolution output arrays, with each convolution output array corresponding to a set of filters. Each set of filters can correspond to an output channel. For example, the multiple sets of filters may correspond to multiple features to be detected from the set of images, and each convolution output array may correspond to the detection results for each feature from the set of images. For example, where M sets of filters are applied to C images to generate M convolution output arrays, Equation 2 can be updated as follows:

$$O_{e,f}^m = \sum_{r=0}^{R-1} \sum_{s=0}^{S-1} \sum_{c=0}^{C-1} X_{eD+r, fD+s}^c \times W_{r,s}^{c,m} \qquad \text{(Equation 3)}$$

Here, convolution output $O_{e,f}^m$ and weight $W_{r,s}^{c,m}$ has an index m corresponding to one of the M sets of filters. The index m can denote a particular output channel.

Figure 2A:
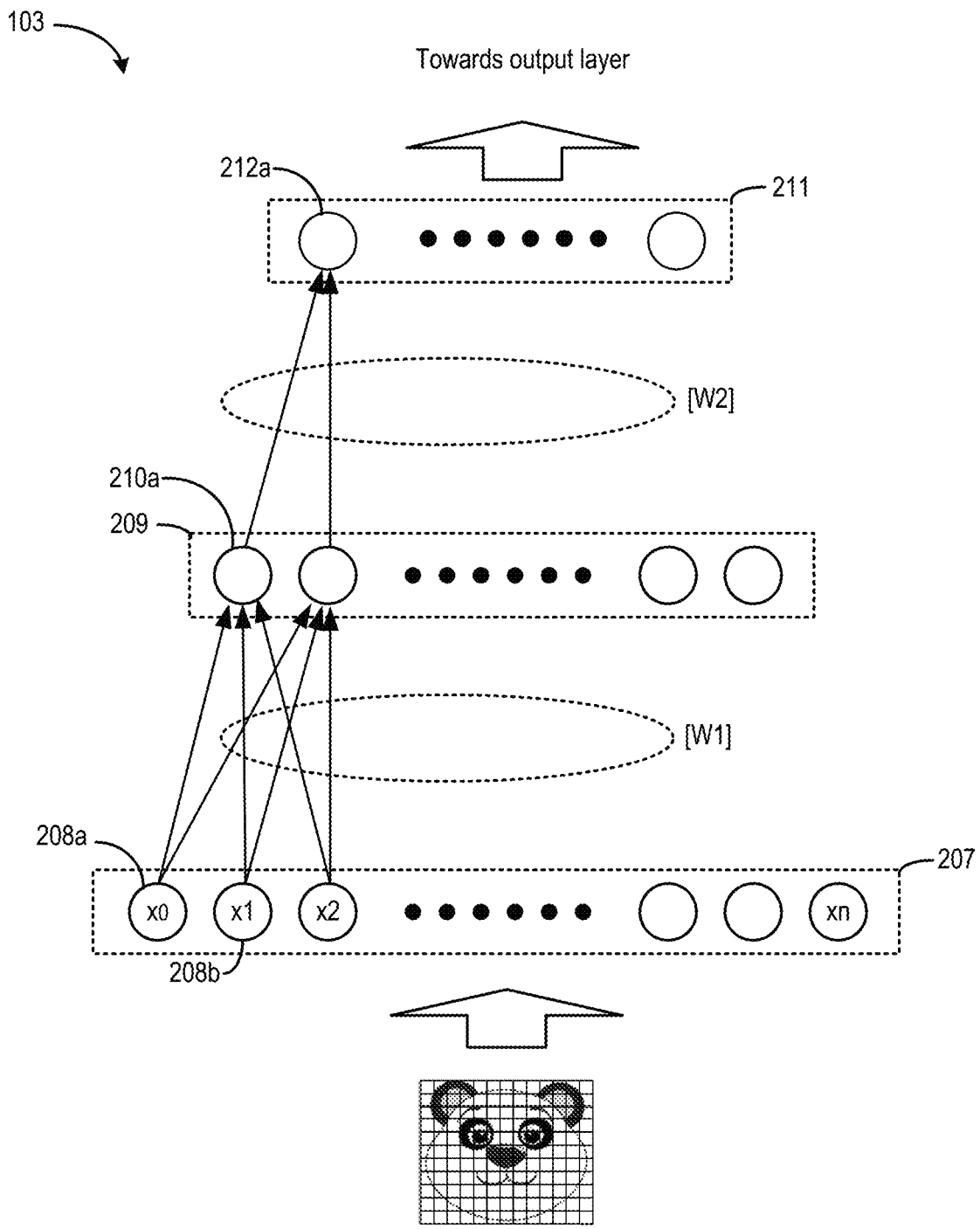
FIGS. 2A-2D are simplified block diagrams illustrating a prediction model and the computations that use techniques disclosed herein, according to certain aspects of the present disclosure.
Figure 2B:
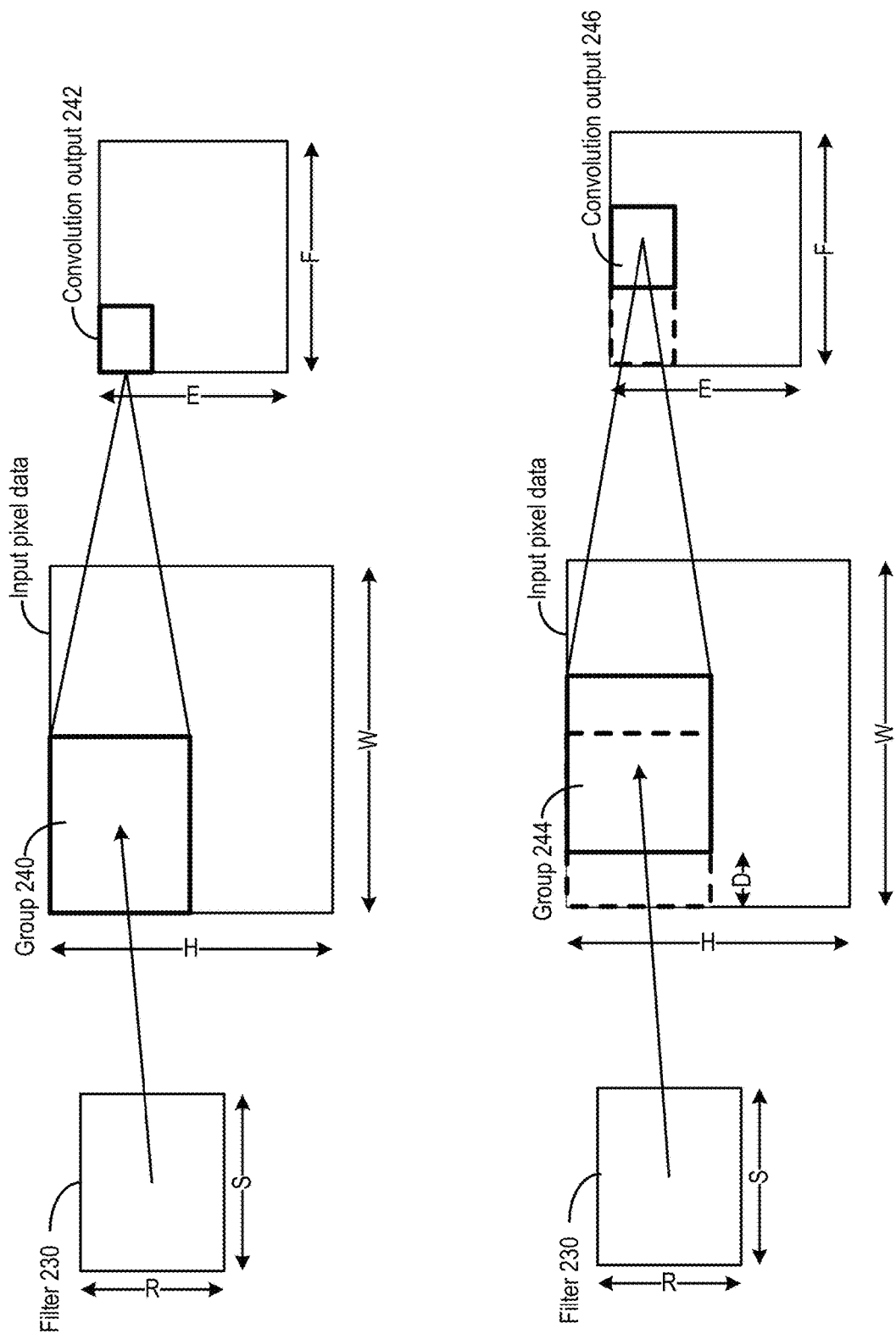
Figure 2C:
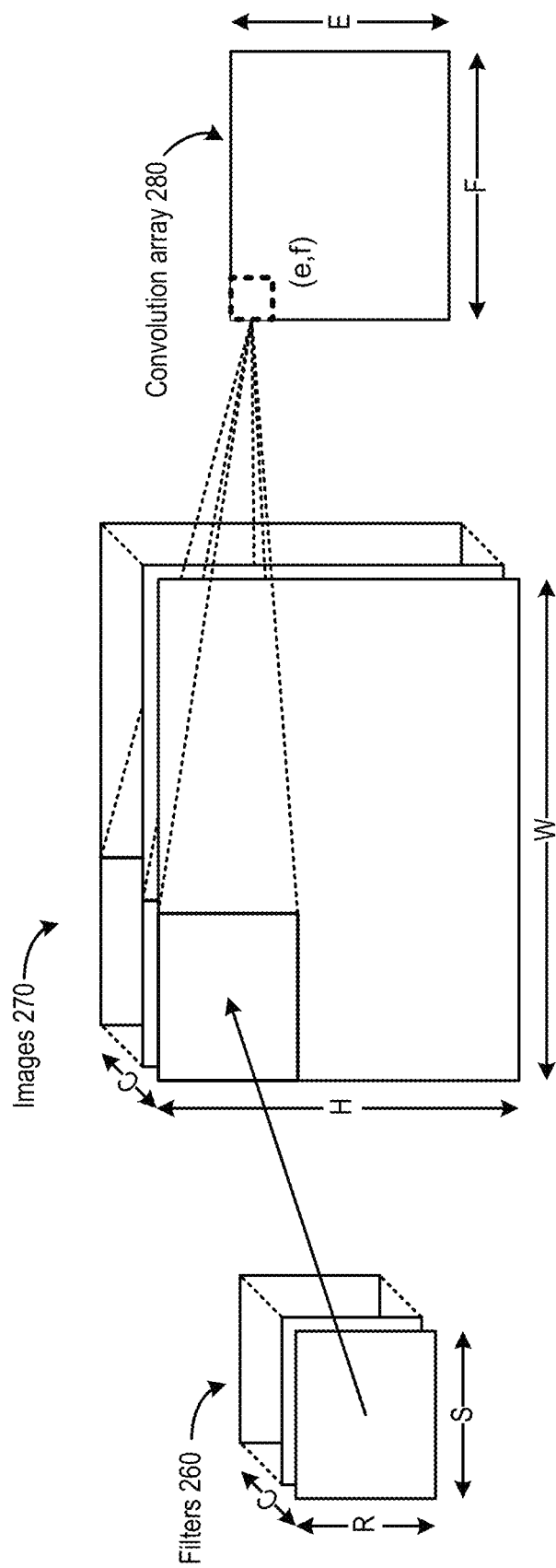
Figure 2D:
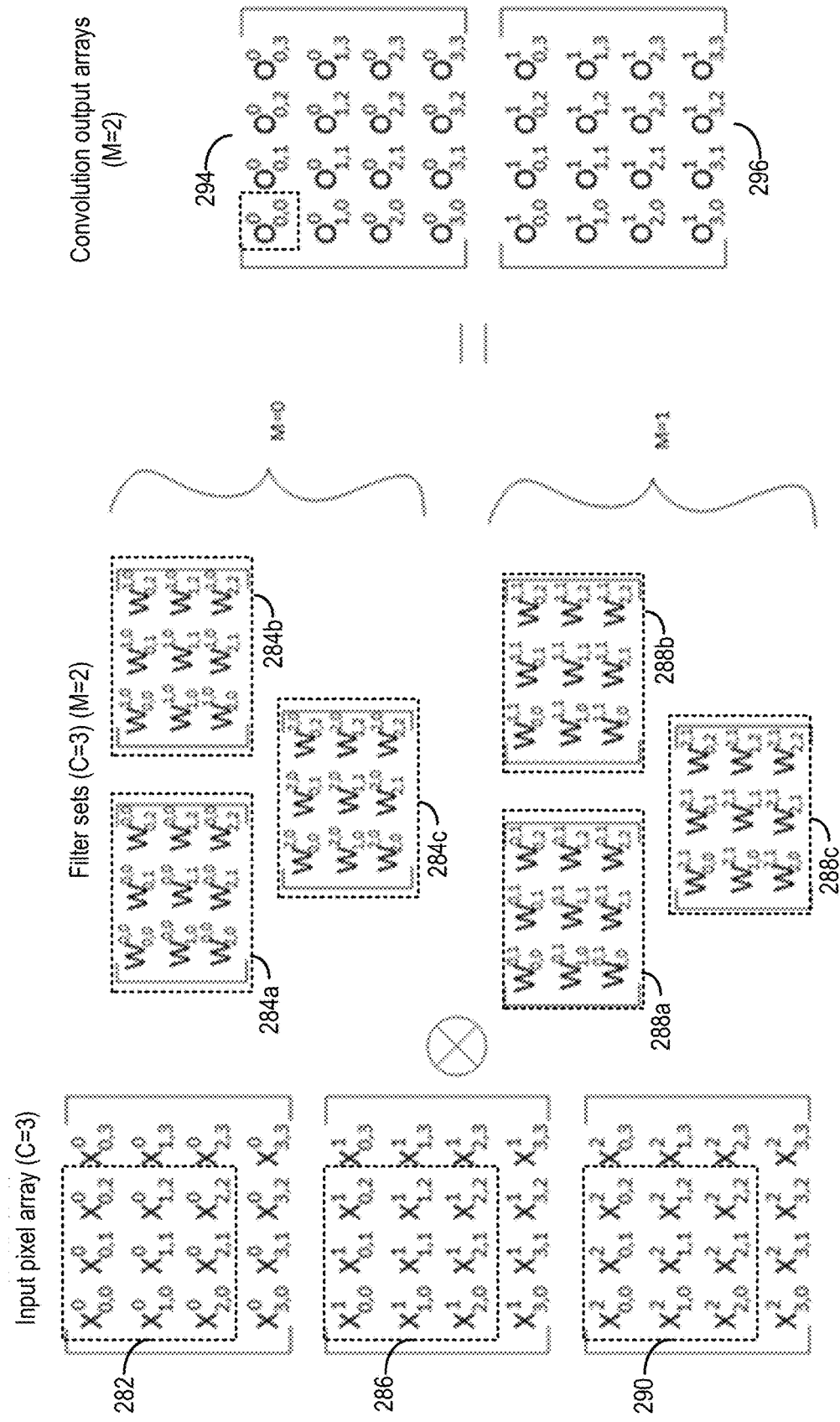

FIG. 2D illustrates an example of C sets of input data sets (with C=3) to be convolved with M sets of filters (with M=2). Each set of input data corresponds to the entries of a pixel array. Each of the M sets of filters includes a set of C filters which correspond to the C sets of input pixel arrays. The convolution operations generate M sets of output data elements, with each set of output data elements corresponding to a convolution output array. Each convolution output array corresponds to convolving one set (of the M sets) of filters with the input pixel arrays. For example, $O_{0,0}^0$ can be generated by a sum of the dot-product between a group of pixels 282 and filter array 284, the dot-product between a group of pixels 286 and filter array 288, and the dot-product between a group of pixels 289 and filter array 292.

Referring back to FIG. 2A, one processing node of layer 209 may be configured to generate the convolution output elements of one convolution output array, and a set M of processing nodes of layer 209 can correspond to a set M of convolution output arrays. The processing node of layer 209 can also process each convolution output with an activation function to generate an activation output. The activation function may translate the convolution output into a decision of whether to forward the convolution output to intermediate layer 211 to influence the classifier decision (analogous to the firing of a biological neuron). An example of the activation function can be a rectified linear unit (ReLU) defined according to the following equation:

$$\text{ReLU}(x) = \begin{cases} x & \text{for } x \geq 0 \\ 0 & \text{for } x < 0 \end{cases} \qquad \text{(Equation 4)}$$

In addition to ReLU, other forms of activation function can also be used including, for example, a softplus function (which can be a smooth approximation of a ReLU function), a hyperbolic tangent function (tanh), an arctangent function (arctan), a sigmoid function, a Gaussian function, etc.

A processing node of layer 209 (e.g., processing node 210a) may process the sum with the ReLU function to generate a first output of layer 209 based on the following equation:

$$\text{first\_output}_{210a} = \text{ReLU}(\text{Sum}_{210a}) \qquad \text{(Equation 5)}$$

Layer 211 may further process the scaled intermediate outputs from layer 209 by, for example performing additional convolution operations based on different sets of filters. The outputs from each processing node of layer 211 may be forwarded to other higher intermediate layers, or to an output layer (not shown in FIG. 2A). The output layer may form an output vector representing, for example, a probability that certain features are included in image 104, and/or a probability that image 204 includes an image of a panda. For example, the output vector may be compared against a reference vector associated with a nose object of a panda, or a reference vector associated with a panda. A decision about whether image 104 is an image of a panda can be determined based on the comparison result.

Figure 3:
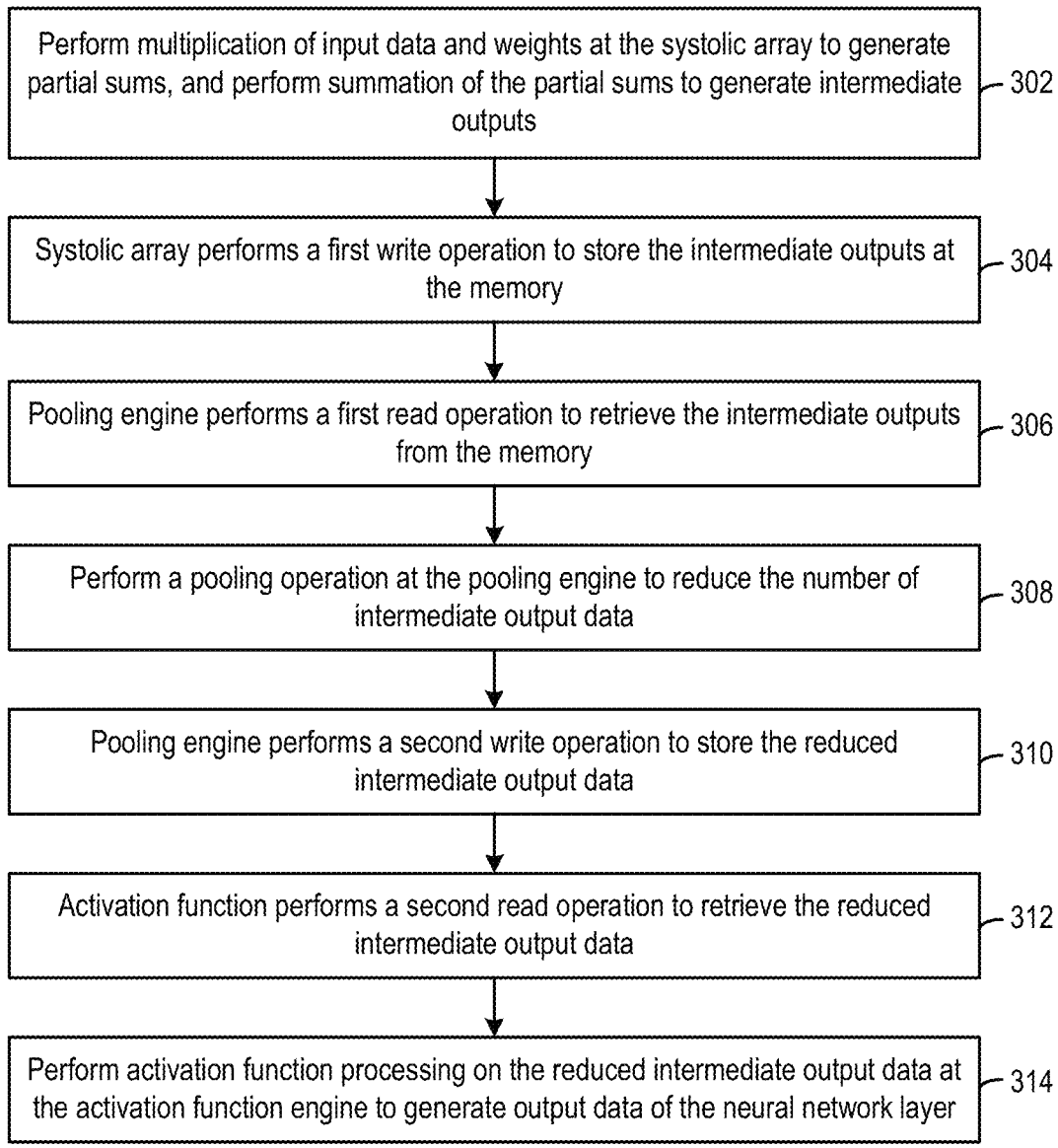
FIG. 3 illustrates an example of sequence 300 of operations that can be performed by a neural network accelerator for a particular neural network layer.

The neural network processing described in FIG. 2A and FIG. 2B can be implemented on a neural network accelerator. FIG. 3 illustrates an example of sequence 300 of operations that can be performed by a neural network accelerator for a particular neural network layer. The neural network accelerator may include a systolic array, a pooling engine, and an activation engine. The neural network accelerator may also include a memory to provide temporary storage.

As shown in FIG. 3, in step 302, multiplication and summation operations can be performed by the systolic array on input data and weights to generate intermediate output data. The multiplication and summation operations can be based on Equation 1 above.

In step 304, the systolic array can perform a first write operation to store the intermediate outputs at the memory.

In step 306, the pooling engine can perform a first read operation to retrieve the intermediate outputs from the memory.

In step 308, the polling engine can perform a pooling operation (e.g., max pooling, average pooling, etc.) to reduce the number of the intermediate output data.

In step 310, the pooling engine can perform a second write operation to store the reduced intermediate output data back to the memory. The reduced intermediate output data can overwrite the input data in the memory.

In step 312, the activation engine can retrieve the reduced intermediate output data from the memory.

In step 314, the activation engine can apply activation function processing on the reduced intermediate output data to generate output data of the neural network layer based on, for example, Equation 2. The output data can be provided as input to the next neural network layer.

As shown in sequence 300, some steps can have data dependency on other steps, which require these steps to be synchronized with each other to have a well-defined timing relationship. For example, the pooling engine should perform the first read operation to retrieve the intermediate outputs (in step 306) only after the systolic array completes the multiplication and summation operations (in step 302) and the first write operation to store the intermediate outputs (in step 304). Moreover, the activation engine should perform the second read operation to retrieve the reduced intermediate outputs (in step 312) only after the pooling engine completes the pooling operation (in step 310) and the second write operation to store the reduced intermediate outputs (in step 312). Therefore, step 306 should be synchronized with step 304 to ensure that step 306 is performed after step 304. Likewise, step 312 should be synchronized with step 310 to ensure that step 312 is performed after step 310.

Moreover, although not shown in sequence 300, there can be resource dependency when, for example, the memory being used in sequence 300 is also used by another different sequence of operations. For example, another sequence may also include the systolic array performing multiplication and summation on a different set of data to generate a second set of intermediate outputs, and storing the second set of intermediate outputs at the memory. But given the memory is also used to store the reduced intermediate outputs of the pooling operation in step 310, the storage of the second set of intermediate outputs should be synchronized with the second read operation for the reduced intermediate outputs (in step 312) to ensure that the storage of the second set of intermediate outputs is performed after step 312.

Figure 4A:
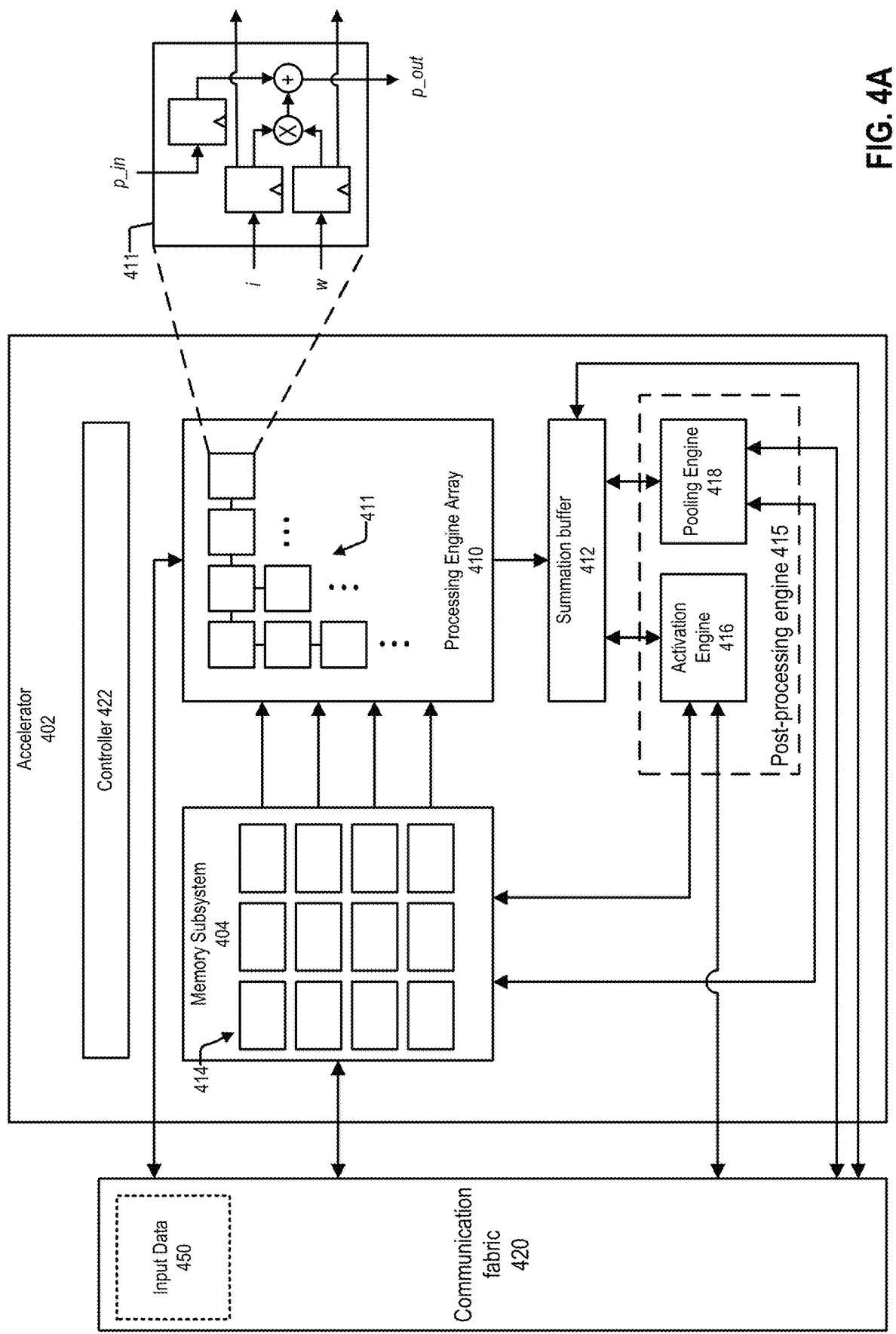

FIG. 4A is a block diagram illustrating an example of an integrated circuit device that can be configured to perform various types of neural network operations, such as those described in FIG. 2A-FIG. 3. The example of FIG. 4A illustrates an accelerator 402. In various examples, the accelerator 402, for a set of input data (e.g., input data 450), can execute accelerator operations using a hardware accelerator unit including, for example, processing engine array 410, a post-processing engine 415 including an activation engine 416, and/or a pooling engine 418. An accelerator operation may include one or more computation operations as well as memory access operations. In some examples, the example accelerator 402 may be an integrated circuit component of a processor, such as a neural network processor. The processor may have other integrated circuit components, including additional accelerator engines. Accelerator 402 may include a controller 422 to control the operations of processing engine array 410, as well as activation engine 416, and/or pooling engine 418 of post-processing engine 415.

In various implementations, the memory subsystem 404 can include multiple memory banks 414. In these implementations, each memory bank 414 can be independently accessible, meaning that the read operation of one memory bank is not dependent on the read operation of another memory bank. Similarly, writing to one memory bank does not affect or limit writing to a different memory bank. In some cases, each memory bank can be read and written at the same time. Various techniques can be used to have independently accessible memory banks 414. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 404 can permit simultaneous access to the read or write channels of multiple memory banks. As another example, the memory subsystem 404 can include arbitration logic such that arbitration between, for example, the outputs of multiple memory banks 414 can result in more than one memory bank's output being used. In these and other examples, though globally managed by the memory subsystem 404, each memory bank can be operated independently of any other.

Having the memory banks 414 be independently accessible can increase the efficiency of the accelerator 402. For example, values can be simultaneously read and provided to each row of the processing engine array 410, so that the entire processing engine array 410 can be in use in one clock cycle. As another example, the memory banks 414 can be read at the same time that results computed by the processing engine array 410 are written to the memory subsystem 404. In contrast, a single memory may be able to service only one read or write at a time. With a single memory, multiple clock cycles can be required, for example, to read input data for each row of the processing engine array 410 before the processing engine array 410 can be started.

In various implementations, the memory subsystem 404 can be configured to simultaneously service multiple clients, including the processing engine array 410, the activation engine 416, the pooling engine 418, and any external clients that access the memory subsystem 404 over a communication fabric 420. In some implementations, being able to service multiple clients can mean that the memory subsystem 404 has at least as many memory banks as there are clients. In some cases, each row of the processing engine array 410 can count as a separate client. In some cases, each column of the processing engine array 410 can output a result, such that each column can count as a separate write client. In some cases, the output from the processing engine array 410 can be written into the memory banks 414 that can then subsequently provide input data for the processing engine array 410. As another example, the activation engine 416 and the pooling engine 418 can include multiple execution channels, each of which can be separate memory clients. The memory banks 414 can be implemented, for example, using static random access memory (SRAM).

In various implementations, the memory subsystem 404 can include control logic. The control logic can, for example, keep track of the address spaces of each of the memory banks 414, identify memory banks 414 to read from or write to, and/or move data between the memory banks 414. In some implementations, memory banks 414 can be hardwired to particular clients. For example, a set of memory banks 414 can be hardwired to provide values to the rows of the processing engine array 410, with one memory bank servicing each row. As another example, a set of memory banks can be hard-wired to receive values from columns of the processing engine array 410, with one memory bank receiving data for each column.

The processing engine array 410 is the computation matrix of the example accelerator 402. The processing engine array 410 can, for example, execute parallel integration, convolution, correlation, and/or matrix multiplication, among other things. The processing engine array 410 includes multiple processing engines 411, arranged in rows and columns, such that results output by one processing engine 411 can be input directly into another processing engine 411. Processing engines 411 that are not on the outside edges of the processing engine array 410 thus can receive data to operate on from other processing engines 411, rather than from the memory subsystem 404.

In various examples, the processing engine array 410 uses systolic execution, in which data arrives at each processing engine 411 from different directions at regular intervals. In some examples, input data can flow into the processing engine array 410 from the left and weight values can be loaded at the top. In some examples, weights and input data can flow from the left and partial sums can flow from top to bottom. In these and other examples, a multiply-and-accumulate operation moves through the processing engine array 410 as a diagonal wavefront, with data moving to the right and down across the array. Control signals can be input at the left at the same time as weights and can flow across and down along with the computation.

In various implementations, the number of columns in the processing engine array 410 determines the computational capacity of the processing engine array 410, and the number of rows determines the required memory bandwidth for achieving maximum utilization of the processing engine array 410. The processing engine array 410 can have, for example, 64 columns and 428 rows, or some other number of columns and rows.

An example of a processing engine 411 is illustrated in FIG. 4A in an inset diagram. As illustrated by this example, a processing engine 411 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 411.

In the illustrated example, an input from above can include a partial sum, p_in, provided either from another processing engine 411 or from a previous round of computation by the processing engine array 410. When starting a computation for a new set of input data, the top row of the processing engine array 410 can receive a fixed value for p_in, such as zero. As illustrated by this example, i and w are multiplied together and the result is summed with p_in to produce a new partial sum, p_out, which can be input into another processing engine 411. Various other implementations of the processing engine 411 are possible.

Outputs from the last row in the processing engine array 410 can be temporarily stored in summation buffer 412. The results can be intermediate results, which can be written to the memory banks 414 to be provided to the processing engine array 410 for additional computation. Alternatively, the results can be final results, which, once written to the memory banks 414 can be read from the memory subsystem 404 over the communication fabric 420, to be output by the system.

In some implementations, the accelerator 402 includes an activation engine 416. In these implementations, the activation engine 416 can combine the results from the processing engine array 410 into one or more output activations. For example, for a convolutional neural network, convolutions from multiple channels can be summed to produce an output activation for a single channel. In other examples, accumulating results from one or more columns in the processing engine array 410 may be needed to produce an output activation for a single node in the neural network. In some examples, activation engine 416 can be bypassed.

In various examples, the activation engine 416 can include multiple separate execution channels. In these examples, the execution channels can correspond to the columns of the processing engine array 410 and can perform an operation on the outputs of a column, the result of which can be stored in the memory subsystem 404. In these examples, the activation engine 416 may be able to perform between 1 and n parallel computations, where n is equal to the number of columns in the processing engine array 410. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 402 can include a pooling engine 418. Pooling is the combining of outputs of the columns of the processing engine array 410. Combining can include, for example, computing a maximum value, a minimum value, an average value, a median value, a summation, a multiplication, or another logical or mathematical combination. In various examples, the pooling engine 418 can include multiple execution channels that can operate on values from corresponding columns of the processing engine array 410. In these examples, the pooling engine 418 may be able to perform between 1 and n parallel computations, where n is equal to the number of columns in the processing engine array 410. In various examples, execution channels of the pooling engine 418 can operate in parallel and/or simultaneously. In some examples, the pooling engine 418 can be bypassed.

Herein, the activation engine 416 and the pooling engine 418 may be referred to collectively as execution engines. The processing engine array 410 is another example of an execution engine. Another example of an execution engine is a Direct Memory Access (DMA) engine, which may be located outside the accelerator 402.

Input data 450 can arrive over the communication fabric 420. The communication fabric 420 can connect the accelerator 402 to other components of a processor, such as a DMA engine that can obtain input data 450 from an Input/Output (I/O) device, a storage drive, or a network interface. The input data 450 can be, for example, one-dimensional data, such as a character string or numerical sequence, or two-dimensional data, such as an array of pixel values for an image or frequency and amplitude values overtime for an audio signal. In some examples, the input data 450 can be three-dimensional, as may be the case with, for example, the situational information used by a self-driving car or virtual reality data. In some implementations, the memory subsystem 404 can include a separate buffer for the input data 450. In some implementations, the input data 450 can be stored in the memory banks 414 when the accelerator 402 receives the input data 450.

In some examples, the accelerator 402 can implement a neural network processing engine. In these examples, accelerator 402, for a set of input data 450, can execute a neural network to perform a task for which the neural network was trained. Executing a neural network on a set of input data can be referred to as inference or performing inference.

The weights for the neural network can be stored in the memory subsystem 404, along with input data 450 on which the neural network will operate. The addresses of the weights and input data 450 in memory subsystem 404 can be based on or mapped to the coordinates of the weights and input data 450 in, respectively, a weight data array and an input data array, which allows the weight and the input data to be retrieved based on addresses derived from their coordinates. The neural network can also include instructions, which can be executed by controller 422 to control the processing engine array 410 to perform various computations on the weights and the input data. The instructions can be generated by a compiler and can also be stored in the memory subsystem 404, in the memory banks 414 or in a separate instruction buffer. The processing engine array 410 can output intermediate results, which represent the outputs of individual layers of the neural network. In some cases, the activation engine 416 and/or pooling engine 418 may be enabled for computations called for by certain layers of the neural network. The accelerator 402 can store the intermediate results in the memory subsystem 404 for inputting into the processing engine array 410 to compute results for the next layer of the neural network. The processing engine array 410 can further output final results from the last layer of the neural network. The final results can be stored in the memory subsystem 404 and then be copied out to host processor memory or to another location.

Figure 4B:
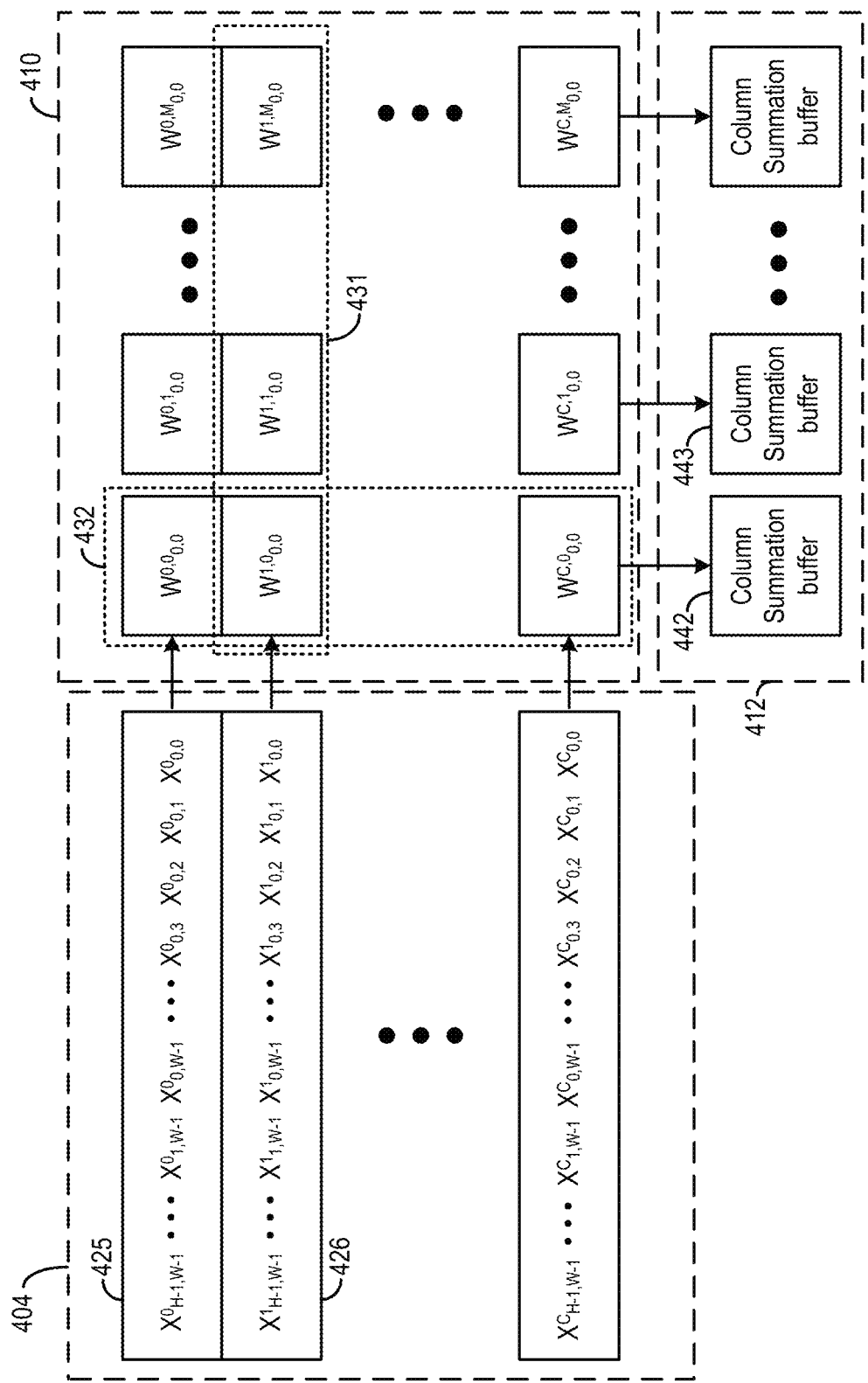

FIG. 4B-FIG. 4E illustrate examples of operations of accelerator 402. As shown in FIG. 4B, memory subsystem 404 can be organized into multiple rows, such as memory rows 425, 426, etc. In one example, the input data may be organized into three-dimensional (2D) matrices of image data with a first dimension represented by height H, a second dimension represented by width W, a third dimension represented by channel C. In the example of FIG. 4B, each memory row can store two-dimensional (2D) input data elements (across height H and weight W) of a particular input channel C.

The processing engines 411 of processing engine array 410 can be organized into rows, such as row 431, and columns, such as column 432. In one example, each row of processing engines 411 can be mapped to an input channel (C) and can receive input data elements sequentially from a memory row of memory subsystem 404 mapped to the input channel, whereas each column of processing engines 411 can be mapped to an output channel (parameter m in Equation 3). Input data elements are stored in a contiguous address space and following an order based on their coordinates in the input data array. Each processing engine 411 can store a weight data element for an input channel and an output channel the processing engine is mapped to. Each column of processing engines 411. Referring to FIG. 4A and FIG. 4B, a processing engine 411 within an engine can receive input data elements of an input channel (e.g., input data i of FIG. 4A), multiply it with the stored weight (e.g., weight data w of FIG. 4A) to generate a product, add the product to the input partial sum p_in to generate the new partial sum p_out, and pass the new partial sum p_out to the processing engine 411 below of the same column. The bottom processing engine 411 of a column can generate a partial sum representing a sum of products between the weight data elements stored in the column of processing engines 411 and the input data elements of different input channels received from memory subsystem 404. The sum of products can represent the partial results of the convolution operation of Equation 3.

The generation of partial sums can be performed in multiple iterations. For example, in a first iteration, column 432 of processing engines 411 can generate a first partial sum based on the stored weight data elements and input data elements provided by memory subsystem 404 as follows:

$$\text{First partial sum} = X^0_{0,0} \times W^{0,0}_{0,0} + X^1_{0,0} \times W^{1,0}_{0,0} + \ldots + X^C_{0,0} \times W^{C,0}_{0,0} \quad \text{(Equation 6)}$$

In a second iteration, column 432 of processing engines 411 can generate a second partial sum based on the stored weight data elements and input data elements provided by memory subsystem 404 as follows:

$$\text{Second partial sum} = X^0_{0,1} \times W^{0,0}_{0,0} + X^1_{0,1} \times W^{1,0}_{0,0} + \ldots + X^C_{0,1} \times W^{C,0}_{0,0} \quad \text{(Equation 7)}$$

Each column of processing engines 411 can provide the partial sums generated in the iterations to a column summation buffer, such as column summation buffers 442, 443, etc., both of which are part of summation buffer 412. The partial sums are generated based on weight data elements at the same coordinates of different filter arrays associated with different input and output channels, and the partial sums correspond to different output data elements.

Each column summation buffer can continue accumulating the partial sums received from each column of processing engines 411 until the arithmetic operations on all the input data elements complete. The accumulated partial sums can correspond to, for example, $O_{e,f}^m$ of Equation 3. FIG. 4C illustrates example internal components of a column summation buffer, such as column summation buffers 442 and 443. As shown in FIG. 4C, a column summation buffer may include a number of entries, such as $E_{0,0}$, $E_{0,1}$, $E_{0,2}$, etc. Each entry can have coordinates mapped to coordinates of an output tile, which can represent a region of an output array. Each entry has an adder (not shown in FIG. 4C) which allows the entry to add a received partial sum to the stored partial sum to generate an accumulated partial sum. The entry can then store the accumulated partial sum.

After computing the partial sums from a first set of weight data elements (same coordinates in their respective filter arrays but of different input and output channels), processing engine array 410 can load a new set of weight data elements from different coordinates and repeat the partial sums computations. The new partial sums can be added to the partial sums stored in summation buffer 412 computed from the first set of weight data elements. The computations and accumulations of the partial sums can continue for the rest of the weight data elements to generate the output data elements of the output tile.

Figure 4D:
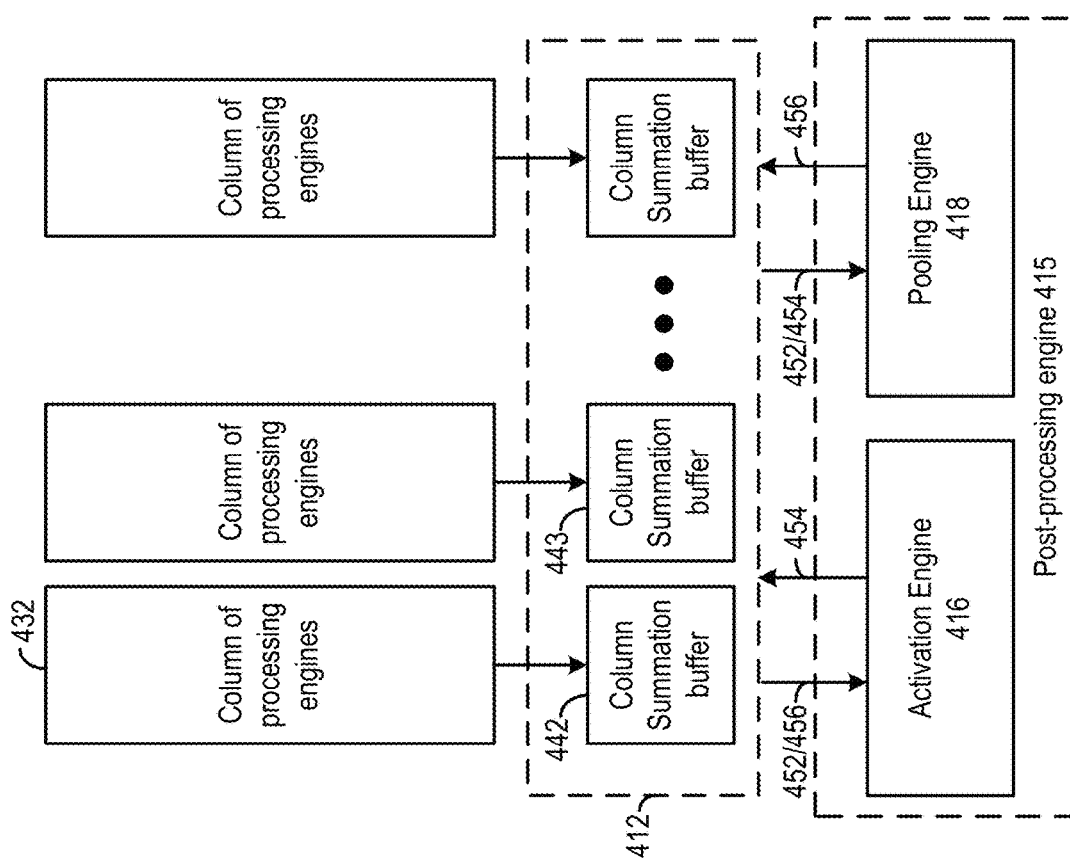

FIG. 4D illustrates the interaction between summation buffer and post-processing engine 415. After the data elements of the output tile are generated and stored in a column summation buffer, such as column summation buffer 442, the column summation buffer 442 can provide the data elements of the output tile to post-processing engine 415 to post-process the output data elements. After the post-processing operation for the output tile in the column buffer completes, post-processing engine 415 can write the post-processed outputs back to memory subsystem 404. A column of processing engines, such as column 432, can perform a new iteration of multiplication and addition operations (e.g., a new convolution operation) to generate new partial sums, and store the new partial sums in the corresponding column summation buffer (e.g., column summation buffer 442).

The post-processing operations performed by post-processing engine 415 can be programmable, and the column summation buffer can be used as a temporary storage space. For example, post-processing engine 415 can be programmed to first perform an activation function process operation on the output tile, followed by a pooling operation. Activation engine 416 can perform a read operation to column summation buffer 442 to obtain output tile elements 452, perform the activation function processing operation on the data elements to generate activation output elements 454, and perform a write operation to store activation output elements 454 back to column summation buffer 442. Pooling engine 418 can then perform a read operation to column summation buffer 442 to obtain activation output elements 454, and perform a pooling operation to generate pooling output elements 456. Pooling engine 418 can store pooling output elements 456 to memory subsystem 404. As another example, post-processing engine 415 can also be programmed to first perform the pooling operation on the output tile, followed by the activation function process operation. In such a case, pooling engine 418 can obtain output tile elements 452 from column summation buffer 442 and then generate and store pooling output elements 456 back to column summation buffer 442. Activation engine 416 can obtain pooling output elements 456 from column summation buffer 442, perform the activation function processing operation, and generate and store activation output tile elements 452 to memory subsystem 404. In some examples, post-processing engine 415 can also be programmed to only perform activation function processing or pooling operation. Post-processing engine 415 can then repeat the programmed post-processing operation for the output tile data elements in each column summation buffer.

The aforementioned convolution operations, the activation function processing operations, and the pooling operations can be represented by instructions. Each of processing engine array 410, activation engine 416, and pooling engine 418 can execute an instruction to perform, respectively, a convolution operation, an activation function processing operation, and a pooling operation. In some examples, each instruction can correspond to an operation for an output tile of data and can use a column summation buffer as temporary storage for the operation.

Data dependency and resource dependency may exist among these instructions. For example, a neural network operation may include a convolution operation to generate intermediate outputs, followed by an activation function processing operation on the intermediate outputs to generate activation outputs, and then followed by a pooling operation on the activation outputs to generate pooling outputs. In such an example, the instruction for the activation function processing operation can have a data dependency on the instruction for the convolution operation. Moreover, the instruction for the pooling operation can have a data dependency on the instruction for the activation function operation. Moreover, as the column summation buffer is used to store the activation function outputs to be read by the pooling engine, and that column summation buffer is reused to start a new convolution operation for a new output data tile, the instruction for the new convolution operation also has a resource dependency on the instruction for the pooling operation. Specifically, the new convolution operation can write to the column summation buffer only after the pooling operation completes reading the column summation buffer for the activation function output.

Figure 4E:
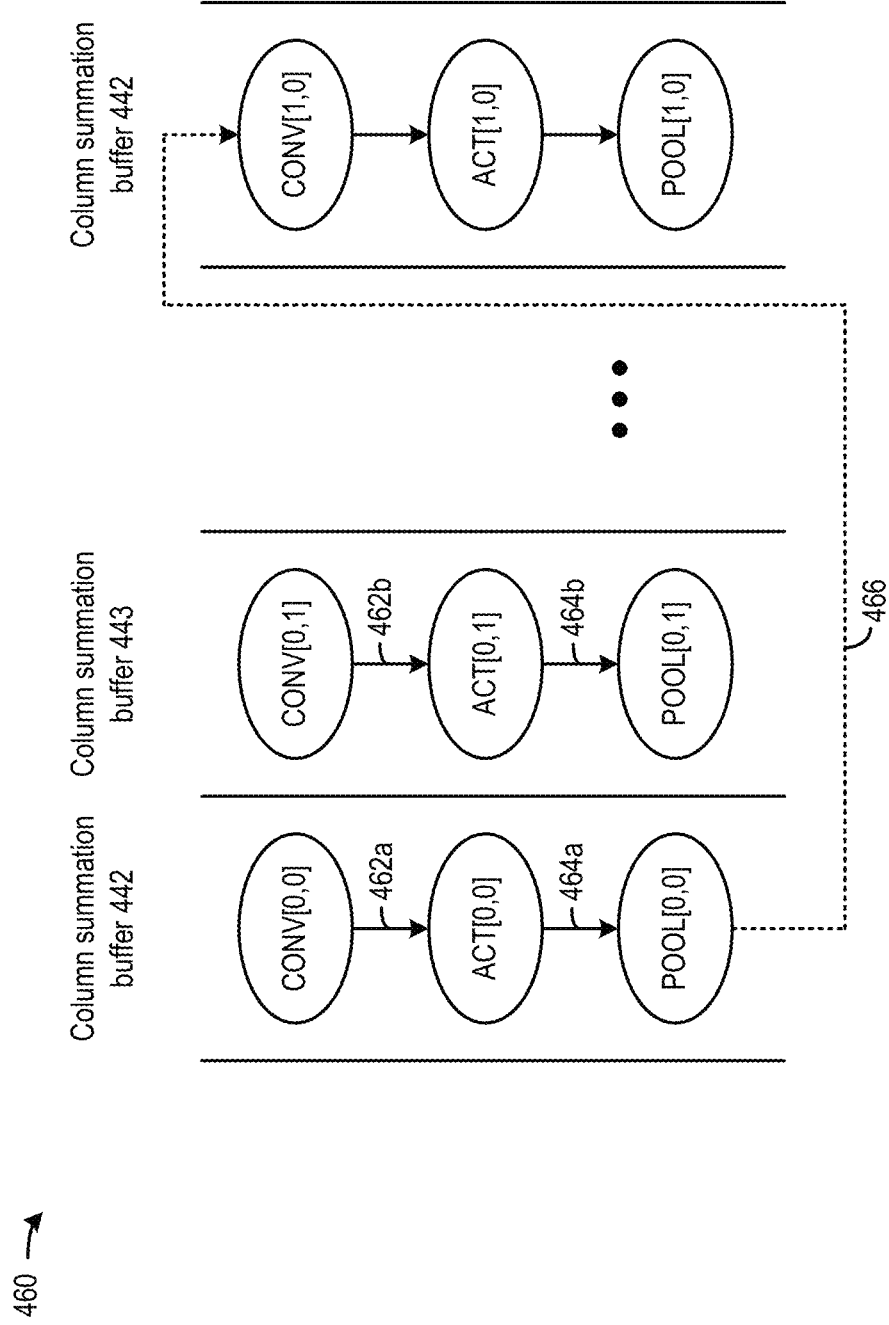

FIG. 4E illustrates an example of data and resource dependency diagram 460 of the convolution operations, activation function processing operations, and pooling operations at column summation buffers of accelerator 402 including, for example, column summation buffers 442 and 443. Each oval can represent an instruction of an operation. For example, CONV[0,0] can represent a convolution operation between a first set of input data (e.g., $X^0_{0,0}$, $X^1_{0,0}$, ... $X^C_{0,0}$) and a first set of weight data (e.g., $W^{0,0}_{0,0}$, $X^{1,0}_{0,0}$, ... $X^{C,0}_{0,0}$ of FIG. 4B) at column 432 of processing engines to generate an output tile of intermediate outputs, which can then be stored at column summation buffer 442. A subsequent activation function processing operation to generate activation outputs based on the intermediate outputs, ACT[0,0], has a data dependency on CONV[0,0] operation represented by arrow 462a. A subsequent pooling operation to generate pooling outputs based on the activation outputs, POOL[0,0], has a data dependency on ACT[0,0] operation represented by arrow 464a.

Moreover, CONV[0,1] can represent a convolution operation between the first set of input data and a second set of weight data (e.g., $W^{0,1}_{0,0}$, $W^{1,1}_{0,0}$, ... $W^{C,1}_{0,0}$ of FIG. 4B) to generate an output tile of intermediate outputs to be stored at column summation buffer 443. A subsequent activation function processing operation, ACT [1,0], has a data dependency on CONV[1,0] operation represented by arrow 462b. A subsequent pooling operation to generate pooling outputs based on the activation outputs, POOL[1,0], has a data dependency on ACT[1,0] operation represented by arrow 464b.

After the convolution operation at column 432 of processing engines involving the first set of input data completes, column 432 can start a new convolution operation involving a second set of input data, represented by CONV [1,0]. The intermediate outputs of CONV[1,0] are to be stored at column summation buffer 442. But since POOL [0,0] operation also reads column summation buffer 442 for activation outputs, there exists a resource dependency between CONV[1,0] operation and POOL[0,0] operation, as represented by arrow 466.

In FIG. 4E, the executions of an instruction that have dependency (data dependency, resource dependency, etc.) on another instruction needs to be synchronized to have a well-defined timing relationship. For example, as indicated by arrow 462a, the execution of ACT[0,0] instruction can start only after CONV[0,0] (and the storage of intermediate outputs) completes execution. Moreover, as indicated by arrow 464a, the execution of POOL[0,0] instruction can start only after ACT [0,0] (and the storage of activation outputs) completes execution. Further, as indicated by arrow 466, the execution of CONV[1,0] instruction can start only after the read operation of POOL[0,0] completes.

Figure 4F:
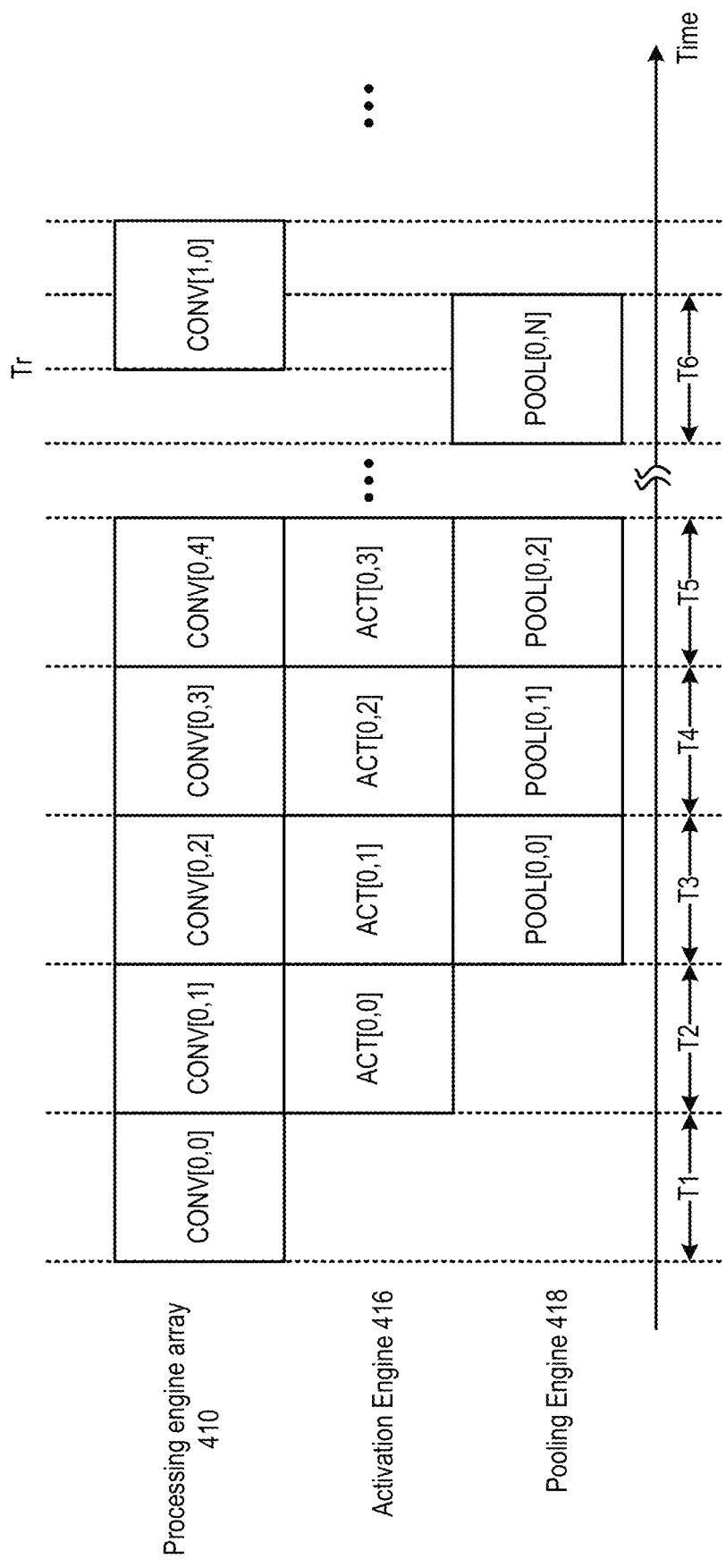

On the other hand, an instruction that do not have data nor resource dependencies with another instruction can be executed in parallel. In some examples, instructions can be executed in a pipeline arrangement in each of processing engine array 410, activation engine 416, and pooling engine 418, to facilitate parallel execution of instructions that do not have data nor resource dependencies among them, which can reduce the total time of performance of neural network operations represented by those instructions. FIG. 4F illustrates an example of a timing diagram 470 of execution of the instructions shown in FIG. 4F. As shown in FIG. 4F, processing engine array 410 can execute the CONV[0,0] instruction within time T1. This includes, for example, column 432 of processing engines obtaining a first set of input data (e.g., (e.g., $X^0_{0,0}$, $X^1_{0,0}$, ... $X^C_{0,0}$), each multiplying with a respect weight of the first set of weight data (e.g., $W^{0,0}_{0,0}$, $W^{1,0}_{0,0}$, ... $W^{C,0}_{0,0}$ of FIG. 4B) to generate a product, summing the products to generate a partial sum, and storing the partial sum at column summation buffer 442.

Within time T2, the ACT[0,0] instruction can be executed based on the partial sum at column summation buffer 442 (from CONV[0,0]) to generate activation outputs and to store the activation outputs back to column summation buffer 442. Moreover, the CONV[0,1] instruction can also be executed within time T2 at a column of processing engines 411 adjacent to column 432 as the first set of input data propagates from column 432. The first set of input data can be multiplied with the second set of weight data (e.g., $X^{0,1}_{0,0}$, $X^{1,1}_{0,0}$, ... $X^{C,1}_{0,0}$) to generate products, the products can be summed to generate a partial sum, and the partial sum can be stored in column summation buffer 443. The CONV[0,1] and ACT[0,0] instructions can be executed in parallel as each instruction have no data or resource dependency on each other.

Within time T3, the POOL[0,0] instruction can be executed based on the activation outputs at column summation buffer 442 (from ACT[0,0]) to generate pooling outputs. Within time T3, CONV[0,2] instruction and ACT[0,1] instruction can also be executed in parallel with POOL[0,0] instruction. This is because the execution of CONV[0,2] instruction stores partial sum at another column summation buffer and has no data nor resource dependencies on ACT [0,1] nor POOL[0,0] instructions. Moreover, ACT[0,1] instruction operates on the partial sum generated by CONV [0,1] instruction and also has no data dependency on POOL

[0,0]. As such, in subsequent times T4 and T5, CONV, ACT, and POOL instructions that do not have data nor resource dependencies among them can be executed in parallel to generate an output tile of data.

At time T6, a POOL[0,N] instruction can be executed to perform the pooling operation on the last data element of the output tile. At time Tr (within time T6) after POOL[0,N] completes the read operation of activation outputs from a column summation buffer, the execution of the CONV[1,0] instruction for the next output tile of data can start. As described above, as CONV[1,0] stores a partial sum back to a column summation buffer from which POOL [0,N] reads the activation outputs, there exists a resource dependency of CONV[1,0] on POOL[0,N]. As a result, the execution of CONV[1,0] is delayed until the read operation of POOL[0, N] completes and the resource dependency is removed.

As shown in FIG. 4E and FIG. 4F, some of the instructions executed in processing engine array 410, activation engine 416, and pooling engine 418 can have data and/or resource dependency among them, which requires the execution of these instructions to be synchronized to follow well-defined timing relationships. Moreover, some of the instructions also do not have any dependency among them, which allow these instructions to be executed in parallel to speed up the neural network operation. Therefore there is a need to provide a mechanism to synchronize the instructions when needed, and to provide a way to clearly indicate, to both accelerator 402 and to the programmer who creates the program file, how the instructions are synchronized, to ensure a proper sequence of execution of instructions that have data/resource dependencies while maximizing parallel execution of instructions that do not have such dependencies.

Figure 5A:
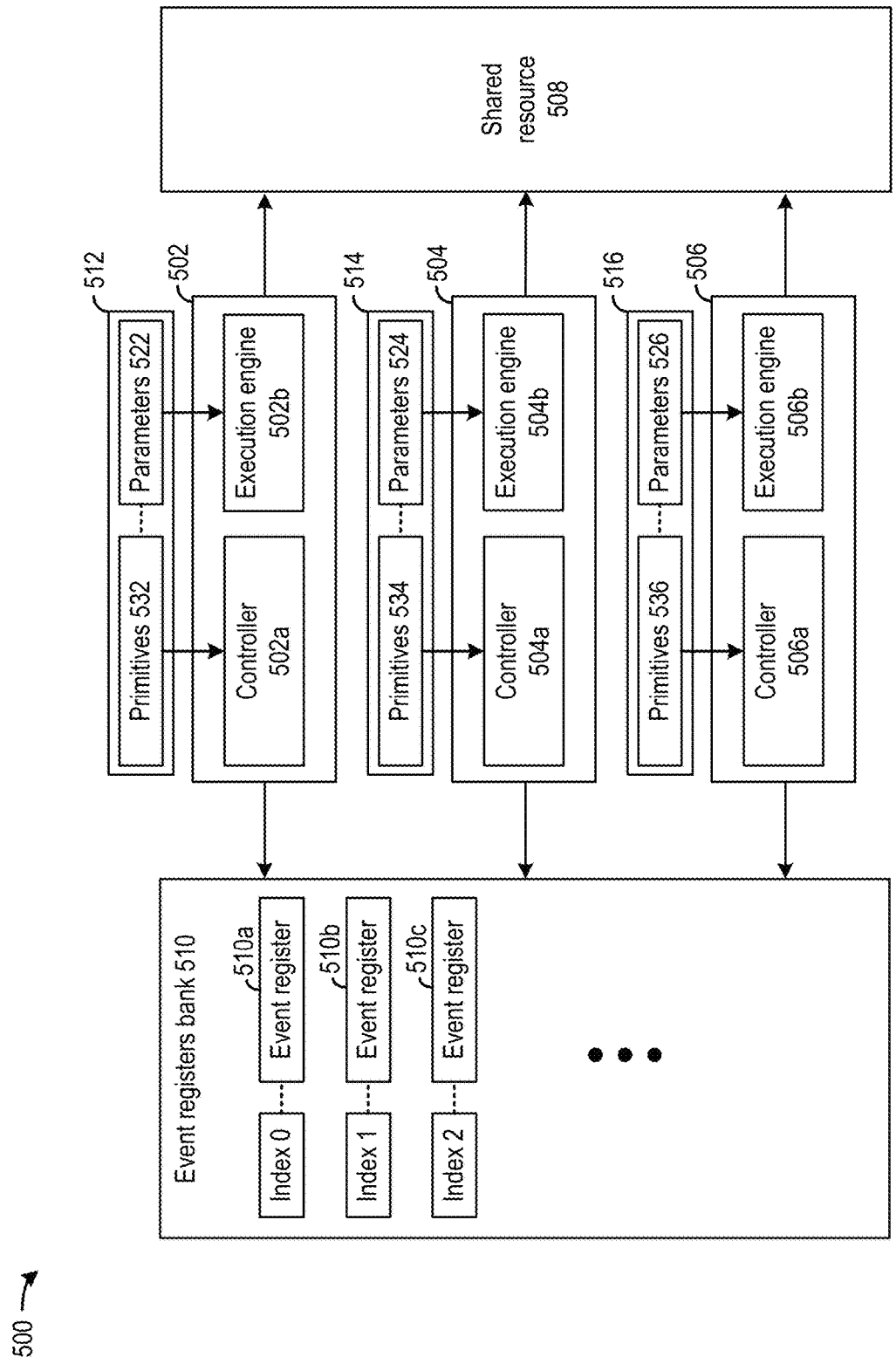
FIGS. 5A-5D illustrate examples of components that support synchronized operations in a neural network processor, according to certain aspects of the present disclosure.

FIG. 5A-FIG. 5D illustrate additional examples of internal components of a hardware accelerator 500 and their operations. Hardware accelerator 500 can include components of hardware accelerator 402 of FIG. 4A. As shown in FIG. 5A, each of a hardware accelerator unit, such as hardware accelerator units 502, 504, and 506, includes a controller (e.g., controllers 502a, 504a, and 506a, etc.) and an execution engine (e.g., execution engines 502b, 504b, and 506b, etc.). Accelerator 402 also includes a shared resource 508 which can be accessed by each of hardware accelerator units 502, 504, and 508. Accelerator 402 further includes an event registers bank 510 including a plurality of event registers (e.g., event registers 510a, 510b, 510c, etc.) each associated with an index. In one example, hardware accelerator unit 502 can include processing engine array 410 of FIG. 4A, hardware accelerator unit 504 can include activation engine 416 of FIG. 4A, hardware accelerator unit 506 can include pooling engine 418, whereas shared resource 508 can include summation buffer 412.

The controller of each hardware accelerator unit can receive an instruction (e.g., instructions 512, 514, and 516), which includes parameters of an accelerator operation (parameters 522, 524, and 526) and one or more synchronization primitives (synchronization primitives 532, 534, and 536). The controller can control the execution engine to perform the accelerator operation based on the parameters, and access shared resource 508 to support the accelerator operation. Moreover, the controller can access event registers bank 510 based on the synchronization primitives in the instruction. The accessing of event registers bank 510 based on the synchronization primitives can be for synchronizing the execution of the instruction with other instructions. The accessing of event registers bank 510 can include setting an event in an event register to control the start time of other instructions at other hardware accelerator units, reading an event in an event register to determine when the execution engine starts the accelerator operation, etc.

Specifically, execution engine 502b of hardware accelerator unit 502 can include processing engine array 410. Controller 502a of hardware accelerator unit 502 can receive an instruction 512 including parameters 522 of a convolution operation, and control processing engine array 410 to perform the convolution operation based on parameters 522. Parameters 522 may describe, for example, an opcode identifying the convolution operation, a location and a size of the input data for the convolution operation, a precision of the arithmetic operations involved in the convolution operation, an input data type, etc., as well as access operations to shared resource 508 (e.g., write addresses to store the convolution outputs). Instruction 512 may correspond to the CONV instruction of FIG. 4E and FIG. 4F. Controller 502a can also perform a write operation to shared resource 508 (e.g., a column summation buffer) to store the outputs of the convolution operation.

In addition, based on synchronization primitives 532, controller 502a can perform a SET operation to set an event in an event register (e.g., event register 510a) after the write operation, and/or perform a WAIT operation for another event. The setting of the event can control the time of execution of another instruction that has synchronization primitives indicating a WAIT operation for that event. For example, the another instruction may include an ACT instruction, a POOL instruction, etc., that has data dependency on the CONV instruction (e.g., ACT[0,0] having data dependency on CONV[0,0] in FIG. 4E). The hardware accelerator units that execute those instructions can perform a WAIT operation for that event based on the synchronization primitives of those instructions, and can suspend execution until the write operation by the CONV instruction completes. Moreover, based on synchronization primitives 532, controller 502a can also perform the WAIT operation for another event, and suspend the execution of the CONV operation until the other event is set. Synchronization primitives 532 can indicate a WAIT operation (or a WAIT-AND-CLEAR operation) when, for example, the CONV instruction has a resource dependency on another instruction (e.g., CONV[1,0] instruction having a resource dependency on POOL[0,N] instruction in FIG. 4E).

Moreover, execution engine 504b of hardware accelerator unit 504 can include activation engine 416. Controller 504a of hardware accelerator unit 504 can receive an instruction 514 including parameters 524 of an activation function processing operation, and control activation engine 416 to perform the activation function processing operation based on parameters 524. Parameters 524 may describe, for example, an opcode identifying a particular activation function, a precision of the activation function processing operation, etc., as well as access operations to shared resource 508 (e.g., read addresses to obtain the input data for the activation function processing operations, write addresses to store the activation outputs, etc.). Instruction 514 may correspond to the ACT instruction of FIG. 4E and FIG. 4F. Controller 504a can also perform a read operation to shared resource 508 (e.g., a column summation buffer) to obtain the outputs of the convolution operation from a CONV instruction (e.g., instruction 512), perform the activation function processing operation on the convolution outputs to generate activation outputs, and then perform a write operation to shared resource 508 to store the activation outputs.

In addition, based on synchronization primitives 534, controller 504a can perform a WAIT operation an event set by another instruction (e.g., a CONV instruction, a POOL instruction, another ACT instruction, etc.) on which instruction 514 has data dependency. For example, in a case where the activation function processing operation of instruction 514 is performed on the convolution outputs of instruction 512, synchronization primitives 534 can indicate a WAIT operation for the event set by synchronization primitives 532 at event register 510a. Moreover, based on synchronization primitives 534, controller 504a can also perform a SET operation to set an event in another event register (e.g., event register 510b). The setting of the event can control the time of execution of another instruction that has synchronization primitives indicating a WAIT operation for that event. For example, the another instruction may include a POOL instruction, another ACT instruction, etc., that has data dependency on the ACT instruction (e.g., POOL[0,0] having data dependency on ACT[0,0], in FIG. 4E, etc.). The setting of the event can control the time of execution of the another instruction that has synchronization primitives indicating a WAIT operation for that event. In the example of FIG. 5A, different events in different event registers are set by instructions 512 and 514, to ensure that the another instruction is synchronized with the setting of event by instruction 514, not with the setting of event by instruction 512.

Moreover, execution engine 506b of hardware accelerator unit 506 can include pooling engine 418. Controller 506a of hardware accelerator unit 506 can receive an instruction 516 including parameters 526 of a pooling operation, and control pooling engine 418 to perform the pooling operation based on parameters 526. Parameters 526 may describe, for example, an opcode identifying a particular pooling operation, the arithmetic operations involved in the pooling operation, a precision of the pooling operation, etc., as well as access operations to shared resource 508 (e.g., read addresses to obtain the input data for the pooling operations, write addresses to store the pooling outputs, etc.). Instruction 516 may correspond to the POOL instruction of FIG. 4E and FIG. 4F. Controller 506a can also perform a read operation to shared resource 508 (e.g., a column summation buffer) to obtain the outputs of the convolution operation from a CONV instruction (e.g., instruction 512), the outputs of the activation function processing operation from an ACT instruction (e.g., instruction 514), perform the pooling operation to generate pooling outputs, and then perform a write operation to shared resource 508 to store the pooling outputs.

In addition, based on synchronization primitives 536, controller 506a can perform a WAIT operation an event set by another instruction (e.g., a CONV instruction, an ACT instruction, etc.) on which instruction 516 has data dependency. For example, in a case where the pooling operation of instruction 516 is performed on the activation outputs of instruction 514, synchronization primitives 536 can indicate a WAIT operation for the event set by synchronization primitives 534 at event register 510b. Moreover, based on synchronization primitives 534, controller 504a can also perform a SET operation to set an event in another event register (e.g., event register 510c). The setting of the event can control the time of execution of another instruction that has synchronization primitives indicating a WAIT operation for that event. For example, the another instruction may include a CONV instruction that has resource dependency on the POOL instruction (e.g., CONV[1,0] on POOL[0,N]), an ACT instruction or another POOL instruction that has data dependency on the POOL instruction, etc. The setting of the event can control the time of execution of the another instruction that has synchronization primitives indicating a WAIT operation for that event. The event set by instruction 516 can be in a different event register from instruction 512 and instruction 514, to ensure that the another instruction is synchronized with the setting of the event by instruction 516, not with instructions 512 or 514.

Figure 5B:
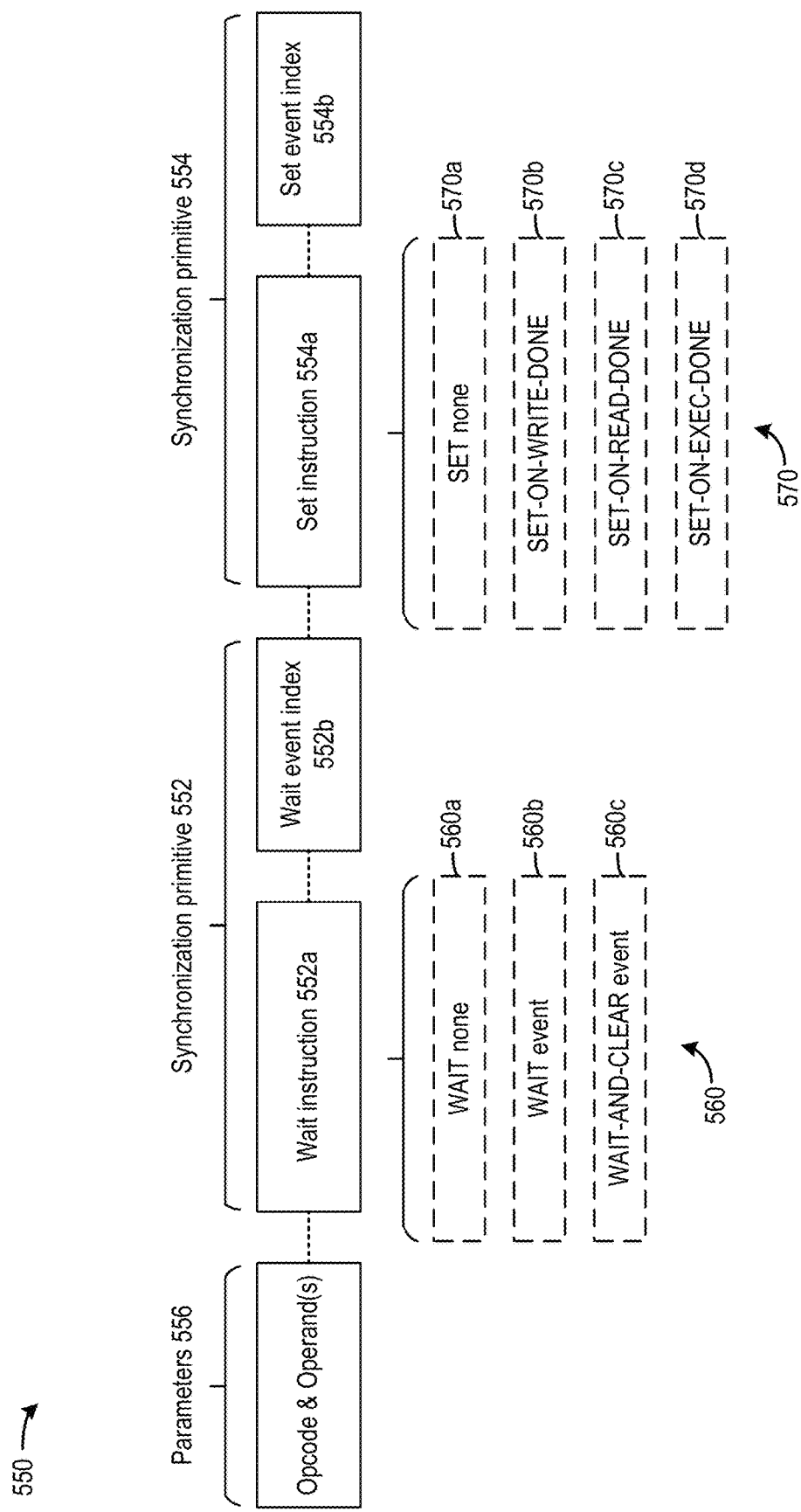

FIG. 5B illustrates examples of synchronization primitives included in an instruction 550 which can include, for example, instructions 512, 514, and 516 of FIG. 5A. As shown in FIG. 5B, instruction 550 may include one or more synchronization primitives including synchronization primitives 552 and 554, as well as parameters 556 of an accelerator operation which can be synchronized with one or more events in event registers bank 510. Synchronization primitive 552 can include a wait instruction 552a and a wait event index 522b which identifies the event which is the subject of the wait instruction. Synchronization primitive 552 can be selected from a plurality of synchronization primitives including different types of WAIT instructions such as, for example, a WAIT none instruction 560a, a WAIT event 560b, a WAIT-AND-CLEAR instruction 560c, etc. WAIT none instruction 560a can indicate that the execution of the accelerator operation of instruction 550 needs not wait for an event to be set. WAIT event instruction 560b can indicate that the execution of the accelerator operation of instruction 550 is to be suspended until an event, identified by wait event index 552b, is set. WAIT-AND-CLEAR instruction 560c can indicate that the execution of the accelerator operation of instruction 550 is to be suspended until the event is set, and then the controller that executes instruction 550 can clear the event.

In addition, Synchronization primitive 554 can include a set instruction 554a and a set event index 554b which identifies the event which is the subject of the set instruction. Synchronization primitive 554 can be selected from a plurality of synchronization primitives including different types of SET instructions such as, for example, a SET none instruction 570a, a SET-ON-WRITE-DONE instruction 570b, a SET-ON-READ-DONE instruction 570c, a SET-ON-EXEC-DONE instruction 570d, etc. SET none instruction 570a can indicate that instruction 550 does not set an event, which indicates that no other instructions needs to wait for instruction 550 to complete in order to start execution. SET-ON-WRITE-DONE instruction 570b can indicate that an event identified by set event index 554b is set after a write operation to a memory (e.g., summation buffer 412), as part of the accelerator operation of instruction 550, completes. SET-ON-READ-DONE instruction 570c can indicate that the event is set after a read operation to the memory, as part of the accelerator operation of instruction 550, completes. SET-ON-EXEC-DONE instruction 570d can indicate that the event is set after the accelerator operation of instruction 550 completes. SET-ON-EXEC-DONE instruction 570d can be included as part of synchronization primitive 554 in a case where the accelerator operation of instruction 550 does not include any read or write operation to the memory.

Figure 5C:
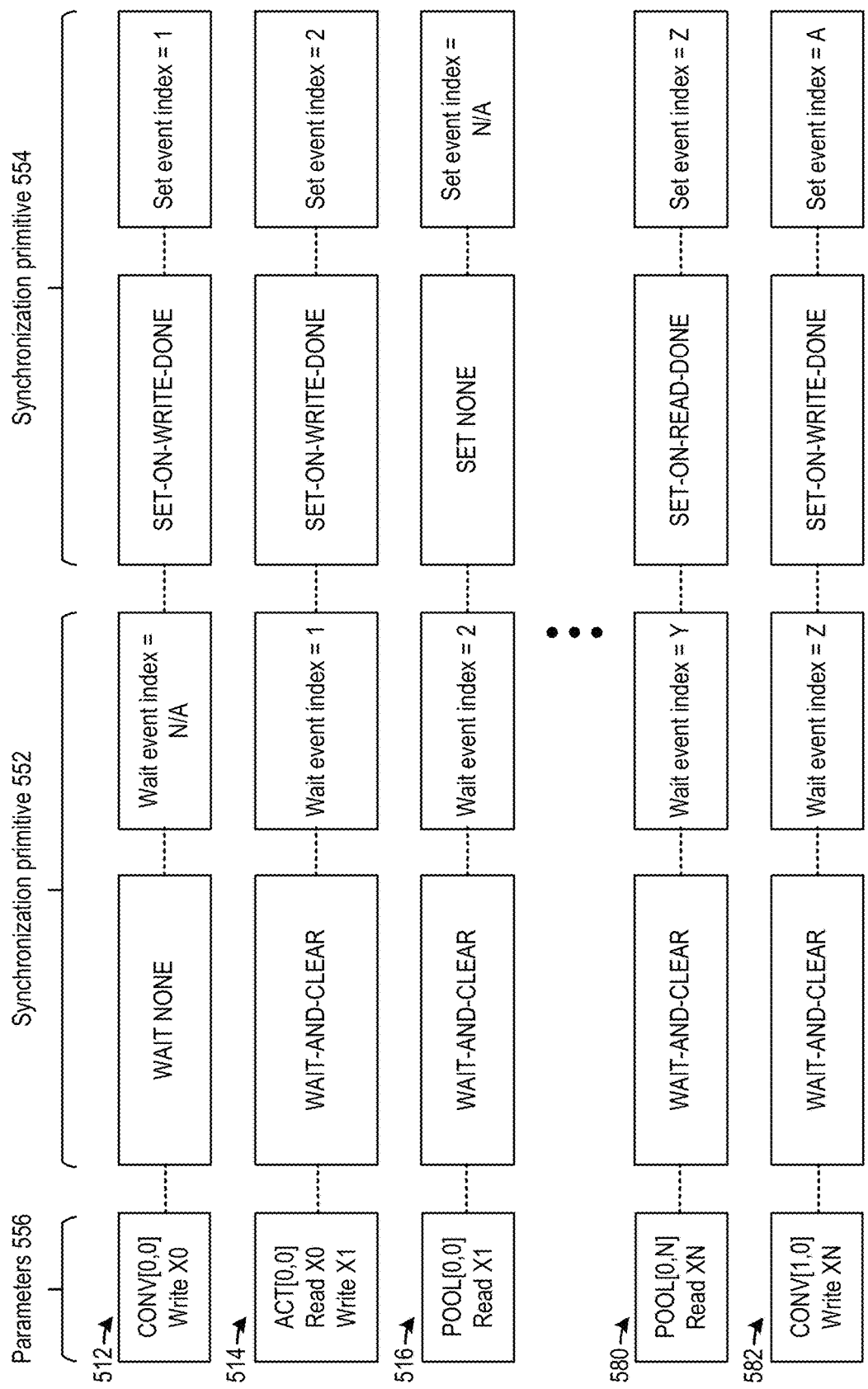

FIG. 5C illustrates examples of instructions that include synchronization primitives to synchronize operations at accelerator 402 based on the data and resource dependencies described in FIG. 4E. As shown in FIG. 5C, instruction 512 represents the CONV[0,0] instruction of FIG. 4E and FIG. 4F. Instruction 512 includes parameters 556 indicating a convolution operation and storing the convolution outputs at address X0 of, for example, column summation buffer 442. Instruction 512 also includes a WAIT none instruction in synchronization primitive 552 to indicate that the execution of the CONV[0,0] instruction needs not wait for any event to be set, which also means the CONV[0,0] instruction can be executed at any time. Moreover, instruction 512 includes a SET-ON-WRITE-DONE instruction in synchronization primitive 554 to set an event of index 1. Other instructions that have data dependency on CONV[0,0] can wait for event of index 1 to be set, and the write operation of CONV[0,0] instruction completes, before starting execution to ensure that those instructions operate on the convolution outputs of CONV[0,0]. In addition, instruction 514 represents the ACT[0,0] instruction of FIG. 4E and FIG. 4F. Instruction 514 includes parameters 556 indicating an activation function processing operation on convolution outputs stored at address X0, and writing the activation outputs at another address X1 of column summation buffer 442. To synchronize with CONV[0,0] of instruction 512, instruction 514 includes a WAIT-AND-CLEAR instruction of event index 1 in synchronization primitive 552 to indicate that the execution of the ACT[0,0] instruction needs to wait for event index 1 to be set after the completion of the write operation of instruction 512. Moreover, instruction 514 includes a SET-ON-WRITE-DONE instruction in synchronization primitive 554 to set an event of index 2. Other instructions that have data dependency on ACT[0,0] can wait for event of index 2 to be set, and the write operation of ACT[0,0] instruction completes, before starting execution to ensure that those instructions operate on the activation outputs of ACT[0,0].

Moreover, instruction 516 represents the POOL[0,0] instruction of FIG. 4E and FIG. 4F. Instruction 516 includes parameters 556 indicating a pooling operation on activation outputs stored at address X1. The pooling output is not written back to column summation buffer 442 but can be stored at memory subsystem 404. To synchronize with ACT[0,0] of instruction 514, instruction 516 includes a WAIT-AND-CLEAR instruction of event index 2 in synchronization primitive 552 to indicate that the execution of the POOL[0,0] instruction needs to wait for event index 2 to be set after the completion of the write operation of instruction 514. Moreover, assuming that no other instruction waits for the pooling output of POOL[0,0], instruction 516 can include a SET none instruction in synchronization primitive 554 to indicate that instruction 516 does not set any event.

FIG. 5C further illustrates instructions 580 and 582. Instruction 580 includes the POOL[0,N] instruction of FIG. 4E and FIG. 4F which represents the pooling operation for the last element of an output tile. Instruction 580 can include, as part of synchronization primitive 552, a WAIT-AND-CLEAR instruction to wait for an event being set after the write operation of another instruction that supplies the input data to POOL[0,N] (e.g., an ACT[0,N] instruction) completes. Instruction 580 can then perform a read operation to address XN to obtain the input data. Instruction 580 further includes, as part of synchronization primitive 554, a SET-ON-READ-DONE instruction to set an event of index Z. The SET-ON-READ-DONE instruction allows another instruction that has resource dependency on instruction 580 (e.g., by having shared access to address XN) to suspend execution and not to write to address X before instruction 580 completes the read operation from address XN. For example, as shown in FIG. 5C, instruction 582, which corresponds to a CONV[1,0] instruction which writes convolution outputs to address XN, includes a WAIT-AND-CLEAR instruction in synchronization primitive 552 to wait for event of index Z to be set. The WAIT-AND-CLEAR instruction of instruction 582 causes controller 502a to suspend the execution of CONV[1,0] instruction until instruction 580 completes the read operation from address XN. Moreover, instruction 582 can include a SET-ON-WRITE-DONE instruction in synchronization primitive 554 to set an event of index A. Other instructions that have data dependency on CONV[1,0] can wait for event of index A to be set, and the write operation of CONV[1,0] instruction completes, before starting execution to ensure that those instructions operate on the convolution outputs of CONV[1,0].

Figure 5D:
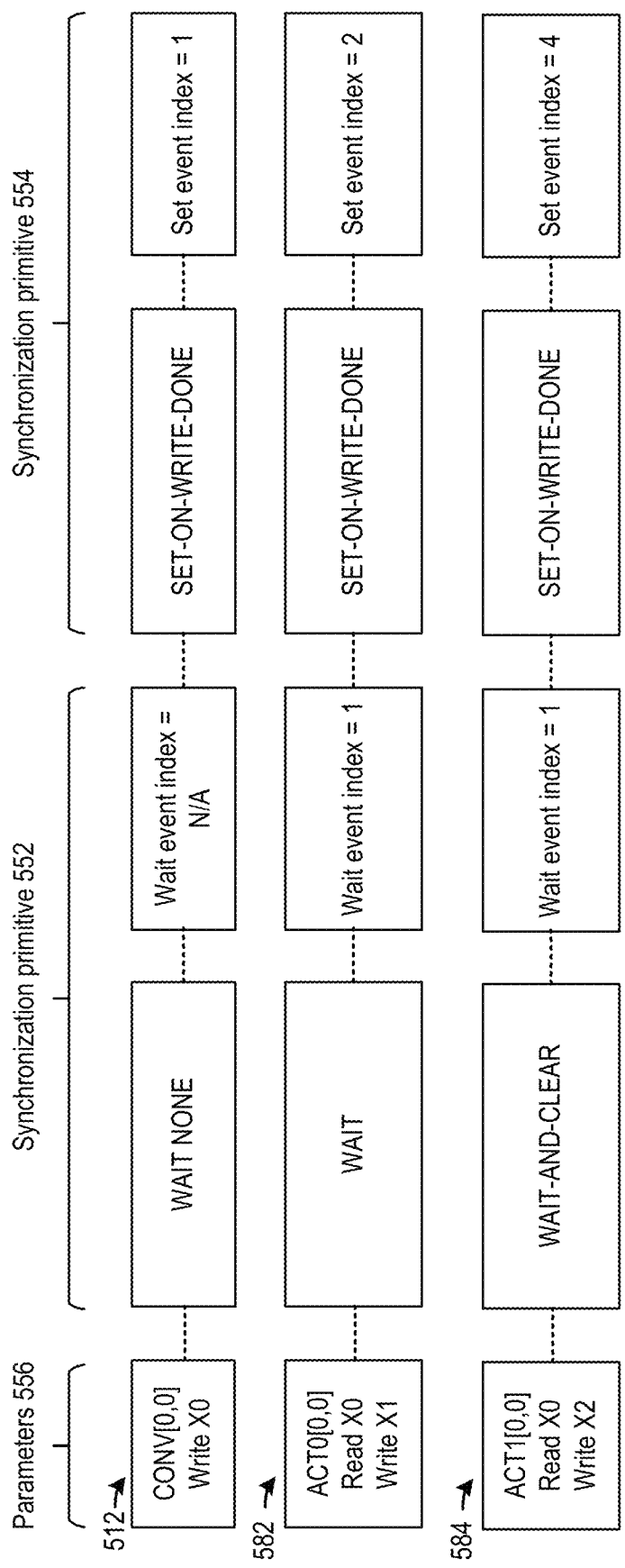

FIG. 5D illustrates examples of instructions that include other synchronization primitives. As shown in FIG. 5D, both instructions 582 and 584 include an activation function processing of convolution outputs from instruction 512. As such, both instructions 582 and 584 have data dependency on instruction 512 and both includes a wait instruction for event of index 1 which is set by instruction 512 after the write operation of the convolution outputs completes. But in order not to have both instructions 582 and 584 attempting to clear the event, one of instructions 582 and 584 (e.g., instruction 582) can have a WAIT instruction in synchronization primitive 552, whereas the other instruction (e.g., instruction 584) can have a WAIT-AND-CLEAR instruction in synchronization primitive. With such arrangements, the activation function processing of both instructions 582 and 584 are synchronized with the write operation of instruction 512 by waiting until the event is set, but only one of them will clear the event. Instructions 582 and 584 will write their activation outputs to different addresses X1 and X2 in separate write operations. Therefore, each instruction includes a SET-ON-WRITE-DONE instruction to set a different event, such that other instructions are synchronized separately to the different write operations.

Figure 6:
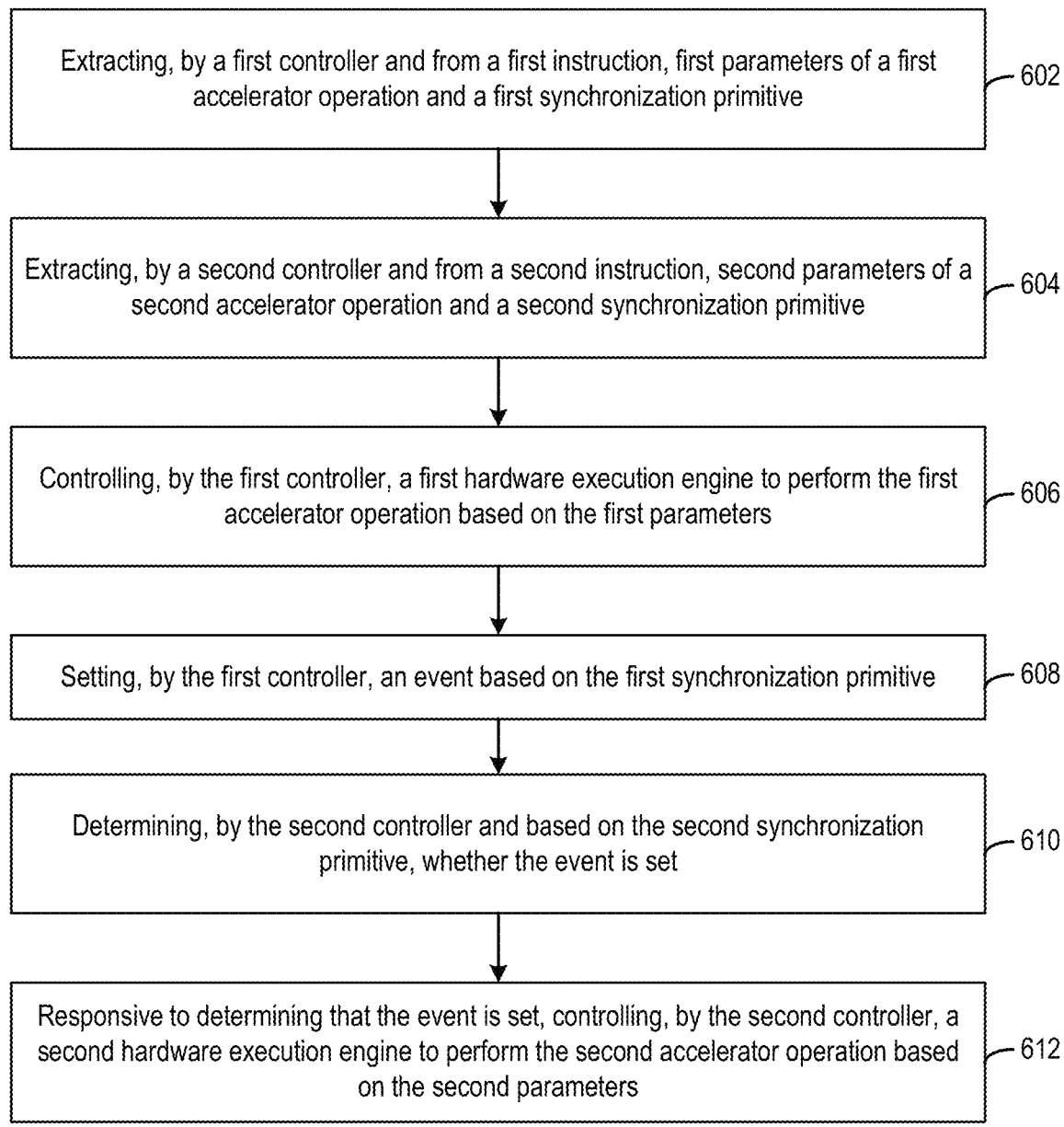
FIG. 6 illustrates an example method of operating a hardware accelerator, according to certain aspects of the present disclosure.

FIG. 6 illustrates a flowchart of a method 600 of operating a hardware accelerator, such as hardware accelerators 402 and 500. The method can be performed by various components of the hardware accelerator.

Method 600 starts with step 602, in which a first controller (e.g., controller 502a) extracts, from a first instruction (e.g., instruction 512), first parameters of a first accelerator operation and a first synchronization primitive. The first accelerator operation may include a convolution operation. The first parameters may include, for example, an opcode identifying the convolution operation, a location and a size of the input data for the convolution operation, a precision of the arithmetic operations involved in the convolution operation, an input data type, etc., as well as access operations to a summation buffer (e.g., write addresses to store the convolution outputs). The first synchronization primitive include any of the synchronization primitive described in FIG. 5B.

In step 604, a second controller (e.g., controller 504a) extracts, from a second instruction (e.g., instruction 514), second parameters of a second accelerator operation and a second synchronization primitive. The second accelerator operation may include a post-processing operation such as, for example, an activation function processing operation, a pooling operation, etc. The second parameters may include, for example, an opcode identifying post-processing operation, a precision of the post-processing operation, an input data type, etc., as well as access operations to the summation buffer (e.g., read addresses to obtain the input data for the post-processing operation, write addresses to store the post-processing outputs, etc.). The second synchronization primitive include any of the synchronization primitive described in FIG. 5B. Steps 602 and 604 can be performed concurrently or at different times.

In step 606, the first controller controls the first hardware execution engine to perform the first accelerator operation based on the first parameters. For example, the first hardware execution engine can perform a convolution operation to generate a first output.

In step 608, the first controller sets an event based on the first synchronization primitive. In some examples, the first controller sets the event based on a SET-ON-WRITE-DONE synchronization primitive, where the first controller sets the event after writing the first output to the summation buffer. In some examples where the first controller needs to perform a read operation at the summation buffer, the first controller can set the event based on a SET-ON-READ-DONE synchronization primitive, where the first controller sets the event after the read operation completes. The event can be set at an event register of the hardware accelerator.

In step 610, the second controller determines, based on the second synchronization primitive, whether the event is set. The second synchronization primitive can include a WAIT event or a WAIT-AND-CLEAR event, which causes the second controller to delay the performance of the second accelerator operation until the event is set.

In step 612, responsive to determining that the event is set, the second controller controls the second hardware execution engine to perform the second accelerator operation based on the second parameters to generate a second output. To support the second accelerator operation, the second controller may perform a read operation at the memory to obtain the first output. The second controller may also perform a write operation at the memory to store the second output.

Figure 7:
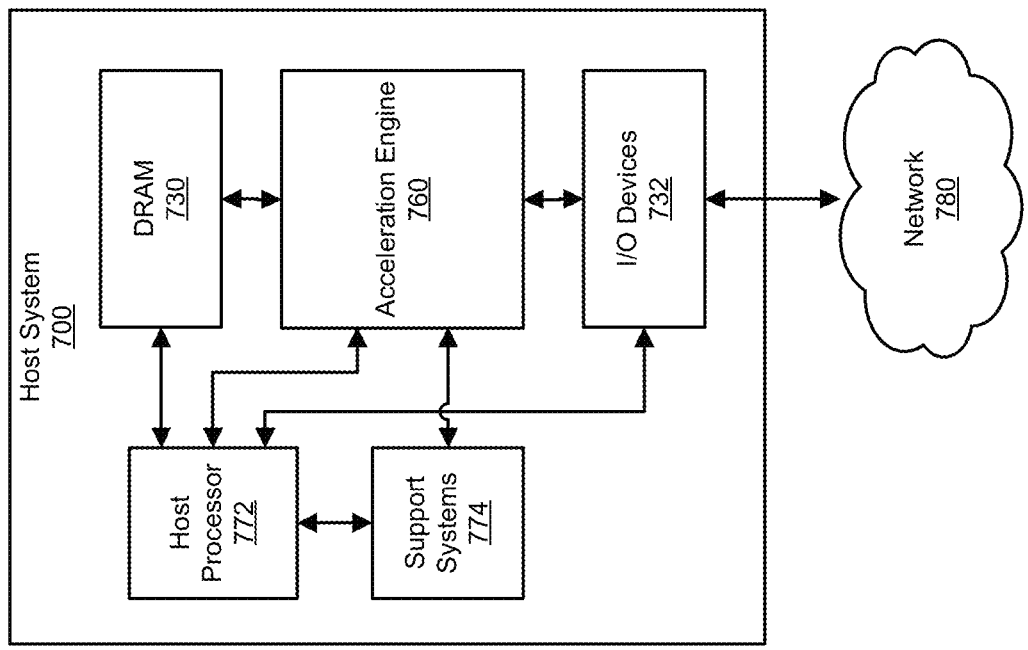
FIG. 7 includes a diagram of an example network.

FIG. 7 includes a block diagram that illustrates an example of a host system 700 in which an acceleration engine 760 can be used. The acceleration engine 760 of FIG. 7 is an example of a device that can include one or more accelerators such as is illustrated in FIG. 4A and FIG. 5A. The example host system 700 of FIG. 7 includes the acceleration engine 760, a host processor 772, DRAM 730 or processor memory, I/O devices 732, and support systems 774. In various implementations, the host system 700 can include other hardware that is not illustrated here.

The host processor 772 is a general purpose integrated circuit that is capable of executing program instructions. In some examples, the host processor 772 can include multiple processing cores. A multi-core processor may include multiple processing units within the same processor. In some examples, the host system 700 can include more than one host processor 772. In some examples, the host processor 772 and the acceleration engine 760 can be one chip, such as, one or more integrated circuits within the same package.

In various examples, the host processor 772 can communicate with other components in the host system 700 over one or more communication channels. For example, the host system 700 can include a host processor bus, which the host processor 772 can use to communicate with the DRAM 730, for example. As another example, the host system 700 can include an I/O bus, such as a PCI-based bus, over which the host processor 772 can communicate with the acceleration engine 760 and/or the I/O devices 732, for example. In various examples, the host system 700 can, alternatively or additionally, include other communication channels or busses, such as serial busses, power management busses, storage device busses, and so on.

In some examples, software programs executing on the host processor 772 can receive or generate input for processing by the acceleration engine 760. In some examples, the programs can select an appropriate neural network to execute for a given input. For example, a program may be for language translation, and can select one or more neural networks capable of speech recognition and/or machine translation. In these and other examples, the programs can configure the acceleration engine 760 with the neural network to execute, and/or can select a neural network processing engine on the acceleration engine 760 that has previously been configured to execute the desired neural network. In some examples, once the acceleration engine 760 has started an inference on input data, the host processor 772 can manage the movement of data (such as weights, instructions, intermediate results, results of conditional layers, and/or final results) into or out of the acceleration engine 760.

In some examples, a software program that is using the acceleration engine 760 to conduct an inference can read the result from a conditional layer from the acceleration engine 760 and/or from a storage location, such as in DRAM 730. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 730 is memory that is used by the host processor 772 for storage of program code that the host processor 772 is in the process of executing, as well as values that are being operated on. In some examples, the data for a neural network (e.g., weight values, instructions, and other data) can be all or partially stored in the DRAM 730. DRAM is a common term for processor memory, and though DRAM is volatile memory, processor memory can be volatile and/or non-volatile. Though not illustrated here, the host system 700 can include other volatile and non-volatile memories for other purposes. For example, the host system 700 can include a Read-Only Memory (ROM) that stores boot code for booting the host system 700 at power on, and/or Basic Input/Output System (BIOS) code.

Though not illustrated here, the DRAM 730 can store instructions for various programs, which can be loaded into and be executed by the host processor 772. For example, the DRAM 730 can be storing instructions for an operating system, one or more data stores, one or more application programs, one or more drivers, and/or services for implementing the features disclosed herein.

The operating system can manage and orchestrate the overall operation of the host system 700, such as scheduling tasks, executing applications, and/or controller peripheral devices, among other operations. In some examples, a host system 700 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 700. For example, some drivers can provide communication between the operating system and peripheral devices or I/O devices 732. Alternatively or additionally, some drivers may provide communication between application programs and the operating system, and/or application programs and peripheral devices accessible to the host system 700. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 732 can include hardware for connecting to user input and output devices, such as keyboards, mice, pens, tablets, voice input devices, touch input devices, displays or monitors, speakers, and printers, among other devices. The I/O devices 732 can also include storage drives and/or network interfaces for connecting to a network 780. For example, the host system 700 can use a network interface to communicate with storage devices, user terminals, other computing devices or servers, and/or other networks, among various examples.

In various examples, one or more of the I/O devices 732 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 700 or may be in an external enclosure. A storage device can be fixed (e.g., attached by screws) or removable (e.g., having a physical release mechanism and possibly a hot-plug mechanism).

Storage devices, the DRAM 730, and any other memory component in the host system 700 are examples of computer-readable storage media. Computer-readable storage media are physical mediums that are capable of storing data in a format that can be read by a device such as the host processor 772. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various implementations, the support systems 774 can include hardware for coordinating the operations of the acceleration engine 760. For example, the support systems 774 can include a microprocessor that coordinates the activities of the acceleration engine 760, including moving data around on the acceleration engine 760. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 772. In some examples, the program executed by the microprocessor is stored on the hardware of microprocessor, or on a non-volatile memory chip in the host system 700. In some examples, the microprocessor and the acceleration engine 760 can be on chip, such as one integrated circuit on the same die and in the same package.

In some examples, the support systems 774 can be responsible for taking instructions from the host processor 772 when programs executing on the host processor 772 request the execution of a neural network. For example, the host processor 772 can provide the support systems 774 with a set of input data and a task that is to be performed on the set of input data. In this example, the support systems 774 can identify a neural network that can perform the task, and can program the acceleration engine 760 to execute the neural network on the set of input data. In some examples, the support systems 774 only needs to select an appropriate neural network processing engine of the neural network processor. In some examples, the support systems 774 may need to load the data for the neural network onto the acceleration engine 760 before the acceleration engine 760 can start executing the neural network. In these and other examples, the support systems 774 can further receive the output of executing the neural network, and provide the output back to the host processor 772.

In some examples, the operations of the support systems 774 can be handled by the host processor 772. In these examples, the support systems 774 may not be needed and can be omitted from the host system 700.

In various examples, the host system 700 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 700 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A hardware accelerator, comprising:
a memory;
a plurality of event registers;
a first hardware accelerator unit including a first controller and a systolic array; and
a second hardware accelerator unit including a second controller and a post-processing engine,
wherein the first controller is configured to:
  receive a first instruction;
  extract, from the first instruction, first parameters of a first convolution operation and a first synchronization primitive;
  control the systolic array to perform the first convolution operation based on the first parameters to generate a first output,
  perform a write operation to store the first output at a location of the memory; and
  based on the first synchronization primitive, set a first event register of the plurality of event registers when the write operation completes; and
wherein the second controller is configured to:
  receive a second instruction;
  extract, from the second instruction, second parameters of a post-processing operation, a second synchronization primitive;
  based on the second synchronization primitive, determine whether the first event register is set;
  responsive to determining that the first event register is set, perform a read operation at the location of the memory to retrieve the first output; and
  control the post-processing engine to perform the post-processing operation on the first output to generate a second output.

2. The hardware accelerator of claim 1, wherein the second instruction further includes a third synchronization primitive;
wherein the write operation is a first write operation;
wherein the second controller is configured to:
extract the third synchronization primitive from the second instruction; and
based on the third synchronization primitive, set a second event register of the plurality of event registers after the read operation completes; and
wherein the first controller is configured to:
receive a third instruction;
extract, from the third instruction, third parameters of a second convolution operation and a second write operation, and a fourth synchronization primitive;
based on the fourth synchronization primitive, determine whether the second event register is set; and
responsive to determining that the second event register is set:
control the systolic array to perform the second convolution operation to generate a third output; and
perform the second write operation to store the third output at the location of the memory.

3. The hardware accelerator of claim 1, wherein the second controller is configured to, based on the second synchronization primitive, clear the first event register after determining that the first event register is set.

4. The hardware accelerator of claim 3, wherein the post-processing engine is a first post-processing engine;
wherein the post-processing operation is a first post-processing operation;
wherein the read operation is a first read operation;
wherein the accelerator further comprises a third hardware accelerator unit, the third hardware accelerator unit including a third controller and a second post-processing engine;
wherein the third controller is configured to:
receive a third instruction;
extract, from the third instruction, fourth parameters of a second post-processing operation and a fourth synchronization primitive;
based on the fourth synchronization primitive, determine whether the first event register is set;
responsive to determining that the first event register is set, perform a second read operation at the location of the memory to retrieve the first output;
control the second post-processing engine to perform the second post-processing operation based on the first output to generate a fourth output; and
based on the fourth synchronization primitive, not clear the first event register after determining that the first event register is set.

5. The hardware accelerator of claim 1, wherein the first synchronization primitive and the second synchronization primitive are selected from a plurality of synchronization primitives; and
wherein the plurality of synchronization primitives further includes:
a third synchronization primitive indicating that the execution of a first accelerator operation does not wait for an event register to be set; and
a fourth synchronization primitive indicating that no event register is set as part of the execution of a second accelerator operation.

6. A hardware accelerator, comprising:
an event register;
a hardware execution engine; and
a controller configured to:
extract, from an instruction, parameters of an operation to be performed by the hardware execution engine, and a synchronization primitive of a plurality of synchronization primitives for an event stored in the event register; and
based on the synchronization primitive, perform at least one of:
controlling a start time of the operation at the hardware execution engine, or determining whether to access the event register.

7. The hardware accelerator of claim 6, wherein the instruction is part of an instruction set supported by the hardware accelerator; and
wherein each instruction of the instruction set includes parameters of an operation of a plurality of operations to be performed by the hardware execution engine and a synchronization primitive of the plurality of synchronization primitives.

8. The hardware accelerator of claim 6, wherein the plurality of synchronization primitives comprises at least one of: a first synchronization primitive indicating a set operation to set the event, or a second synchronization primitive indicating a wait operation to suspend the operation at the hardware execution engine until the event is set.

9. The hardware accelerator of claim 7, wherein the plurality of synchronization primitive indicates different conditions to be satisfied in order to perform the set operation; and
wherein the conditions comprises at least one of: completion of an operation at the hardware execution engine, completion of a write operation to a memory, or completion of a read operation to the memory.

10. The hardware accelerator of claim 7, wherein the plurality of synchronization primitives comprises a wait and clear operation to wait for the event to be set and then to clear the event.

11. The hardware accelerator of claim 7, wherein the plurality of synchronization primitives comprises at least one of: a third synchronization primitive indicating not to set an event, or a fourth synchronization primitive indicating not to wait for an event to be set.

12. The hardware accelerator of claim 6, wherein the hardware execution engine and the controller are, respectively, a first hardware execution engine and a first controller;
wherein the hardware accelerator further comprises a second hardware execution engine and a second controller, and a memory;
wherein the instruction is a first instruction;
wherein the operation is a first operation;
wherein the parameters are first parameters;
wherein the synchronization primitive is a first synchronization primitive;
wherein the first controller is configured to:
control the first hardware execution engine to perform the first operation based on the first parameters to generate a first output;
perform a write operation to store the first output at the memory; and based on the first synchronization primitive, set the event in the event register after the write operation completes; and wherein the second controller is configured to:
receive a second instruction;
extract, from the second instruction, second parameters of a second operation to be performed by the second hardware execution engine, and a second synchronization primitive;
based on the second synchronization primitive, and based on the event being set, perform a read operation at the memory to obtain the first output; and
control the second hardware execution engine to perform the second operation based on the second parameters and the first output to generate a second output.

13. The hardware accelerator of claim 12, further comprising a third controller;
wherein the read operation is a first read operation;
wherein the second controller is configured to, based on the second synchronization primitive, clear the event; and
wherein the third controller is configured to:
receive a third instruction;
extract, from the third instruction, a third synchronization primitive;
perform a second read operation at the memory to obtain the first output; and
based on the third synchronization primitive, not to clear the event.

14. The hardware accelerator of claim 12, wherein the event and the event register are, respectively, a first event and a first event register;
wherein the hardware accelerator further comprises a third hardware execution engine and a third controller, and a second event register storing a second event;
wherein the write operation and the read operation are, respectively, a first write operation and a first read operation;
wherein the second controller is configured to:
extract a third synchronization primitive from the second instruction;
perform a second write operation to store the second output at the memory; and
based on the third synchronization primitive, set the second event at the second event register after the second write operation completes; and
wherein the third controller is configured to:
receive a third instruction;
extract, from the third instruction, third parameters of a third operation to be performed by the third hardware execution engine, and a third synchronization primitive;
based on the third synchronization primitive, determine whether the second event is set;
based on determining that the second event is set, perform a second read operation at the memory to obtain the second output; and
control the third hardware execution engine to perform the third operation based on the third parameters and the second output.

15. The hardware accelerator of claim 6, wherein the hardware execution engine and the controller are, respectively, a first hardware execution engine and a first controller;

wherein the hardware accelerator further comprises a second hardware execution engine and a second controller, and a memory;
wherein the instruction is a first instruction;
wherein the operation is a first operation;
wherein the parameters are first parameters;
wherein the synchronization primitive is a first synchronization primitive;
wherein the first controller is configured to:
perform a read operation to obtain a first output from the memory; and
based on the first synchronization primitive, set the event in the event register after the read operation completes; and
wherein the second controller is configured to:
receive a second instruction;
extract, from the second instruction, second parameters of a second operation to be performed by the second hardware execution engine, and a second synchronization primitive;
based on the second synchronization primitive, and based on the event being set, control the second hardware execution engine to perform the second operation to generate a second output; and
perform a write operation to the memory to store the second output.

16. The hardware accelerator of claim 15, wherein the first hardware execution engine comprises a systolic array;
wherein the second hardware execution engine comprises at least one of: an activation engine, or a pooling engine; and
wherein the memory comprises a partial sum buffer to store partial sums generated by the systolic array or intermediate outputs from the activation engine or the pooling engine.

17. A method of synchronizing operations among a plurality of hardware execution engines, the method comprising:
extracting, by a first controller and from a first instruction, first parameters of a first accelerator operation and a first synchronization primitive;
extracting, by a second controller and from a second instruction, second parameters of a second accelerator operation and a second synchronization primitive;
controlling, by the first controller, a first hardware execution engine to perform the first accelerator operation based on the first parameters;
setting, by the first controller, an event based on the first synchronization primitive;
determining, by the second controller and based on the second synchronization primitive, whether the event is set; and
responsive to determining that the event is set, controlling, by the second controller, a second hardware execution engine to perform the second accelerator operation based on the second parameters.

18. The method of claim 17, wherein the first synchronization primitive indicates that the event is set after the first accelerator operation completes; and
wherein the first controller sets the event after the first accelerator operation completes.

19. The method of claim 18, wherein the first accelerator operation comprises a write operation to store first output data to a memory; and
wherein the second accelerator operation comprises a read operation to read the first output data from the memory.

20. The method of claim 18, wherein the first accelerator operation comprises a read operation to read first data from a location in a memory; and wherein the second accelerator operation comprises a write operation to write second data to the location in the memory.

* * * * *